(12) United States Patent
Combs

(10) Patent No.: US 7,430,822 B1
(45) Date of Patent: Oct. 7, 2008

(54) ELECTROLUMINESCENT VEHICLE LICENSE PLATE FRAME FOR DISPLAYING ADVERTISEMENT AND ASSOCIATED METHOD

(76) Inventor: David M. Combs, 213-2 Brook Hollow La., Newburgh, NY (US) 12550

( * ) Notice: Subject to any disclaimer, the term of this patent is extended or adjusted under 35 U.S.C. 154(b) by 115 days.

(21) Appl. No.: 11/649,135

(22) Filed: Jan. 3, 2007

Related U.S. Application Data

(60) Provisional application No. 60/758,032, filed on Jan. 11, 2006.

(51) Int. Cl.
*G09F 7/00* (2006.01)
*G09F 13/08* (2006.01)

(52) U.S. Cl. .............................. 40/209; 40/544; 40/204; 40/205

(58) Field of Classification Search .................. 40/544, 40/204, 209; D12/193
See application file for complete search history.

(56) References Cited

U.S. PATENT DOCUMENTS

| | | | | |
|---|---|---|---|---|
| 4,466,208 A | * | 8/1984 | Logan et al. .................. | 40/544 |
| 5,005,306 A | * | 4/1991 | Kinstler ....................... | 362/486 |
| D327,915 S | | 7/1992 | Anderson et al. | |
| D455,106 S | | 4/2002 | Yang | |
| D474,724 S | | 5/2003 | Wang | |
| 6,698,118 B2 | * | 3/2004 | Tietze et al. .................. | 40/205 |
| 2005/0262742 A1 | * | 12/2005 | Perrin .......................... | 40/209 |

* cited by examiner

*Primary Examiner*—Cassandra Davis
(74) *Attorney, Agent, or Firm*—Robert C. Montgomery

(57) ABSTRACT

A license plate frame design for providing a thin visually appealing motor vehicle accessory that illuminates advertising text and or a design comprises recessed strip lighting illuminating through recessed color tinted transparent material and through the said advertising test and or said design held or sealed into place by means of a backing plate with a direct current inverter attached by means of lead wires to said motor vehicles controllable direct current power source and to said strip lighting by means of lead wires. Providing the motor vehicle operator to transmit direct current from said motor vehicle when desired, to the said license plate frame to add visual appeal by illuminating their said advertisement and or said design. Thus a very thin and visually appealing motor vehicle accessory is provided.

20 Claims, 29 Drawing Sheets

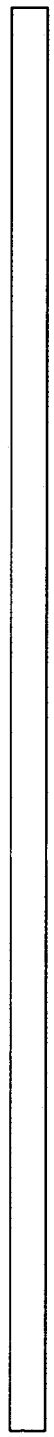
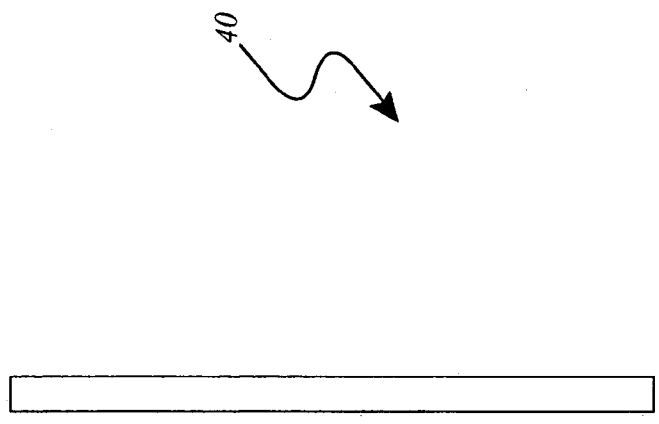
FIG. 5
FIG. 6

ELECTROLUMINESCENT VEHICLE LICENSE PLATE FRAME FOR DISPLAYING ADVERTISEMENT AND ASSOCIATED METHOD

RELATED APPLICATIONS

The present invention was first described in U.S. Provisional Patent No. 60/758,032 filed on Jan. 11, 2006.

FIELD OF THE INVENTION

This invention relates to license plate frames for motor vehicles, and more particularly to an electroluminescent license plate frame that illuminates advertisement indicia imprinted along a front portion of the license plate frame.

BACKGROUND OF THE INVENTION

License plate frames with lighting are usually not appealing to a motor vehicle enthusiast because of the type of lighting system most often used called LED's. Using LED's on license plate frames can often cause a bulky awkward appearance due to the design of the LED and its circuit required to run them. This also limits the variety of color to mainly a red, blue, green, or white. Visual cosmetic appeal, design and usefulness of a motor vehicle accessory are really what determine whether a motor vehicle owner desires to add an accessory to their vehicle. Other forms of license plate frames that have advertisements or designs on them are formed from metal, plastic or composite materials to be raised or recessed in the form of text or a design with the material painted, polished or partially engraved which is very common.

Both U.S. Pat. No. D 455,106 S to Yang (2002) and U.S. Pat. No. D 327,915 to Anderson et al. (1992) show illuminated license plate frames. These license plate frames using a direct current power source, have an illuminated boarder on the frame with conventional lighting at the time they were patented, for example the use of neon tube as they illuminate.

Both of these license plate frames are thick but neither shows a lot of design or text for advertisement and or logos. So in retrospect this is the reason the titles of these patents fit the description of illuminated license plate frames because their only function is to illuminate.

Another design U.S. Pat No. D 474,724 to Wang (2003) show a "LICENSE PLATE FRAME EMBELLISHED WITH A DRAGON HAVING LED ILLUMINATED EYES" once again using a direct current power source. This design is more in depth with detail by using raised and recessed areas on his design. Wang also used an advance in illuminating technology by incorporating LED's in place for the eyes of the dragon. This is a great advancement for motor vehicle enthusiast; however, it is still a thick design and if more LED's were added it would take more space for the LED's themselves and there circuits and in turn the design would not have as much detail unless the license plate frame was even thicker than before, which would make it less appealing to the motor vehicle enthusiast.

In 1979 Auto Shack first opened and in 1987 the company's name was changed to AutoZone®. The company known as AutoZone® has sold many license plate frames. One in particular is the license plate frame that is illuminated by neon lighting and as far as I can tell, it may be Yang's illuminated license plate frame patented in 2002. However it could be from another inventor, but once again there are no text advertisements, no such designs that would be considered as conflicting and it is designed with a thick build.

Summit Racing which is based in Summit County Ohio and has sold auto parts and accessories for 35 years. There are two accessories that Summit Racing offers that are closely related to illuminated license plate frames. One of which has the illuminate on the lower portion that would direct the lighting upward to illuminate the license plate itself. The other is a license plate frame that has a LED brake light as the illuminate located on the lower portion of the license plate frame. Both of which are lacking in design, appeal and are made with a very thick build.

None of the prior art particularly describes an illuminable license plate frame having front and back portions and surface indicia imprinted thereon wherein the surface indicia is illuminated by strip lighting housed between the front and back plates. Accordingly, there is a need for a license plate frame that is produced using the method or design of electroluminescent lighting technology recessed into the back of a license plate frame to provide a light source to illuminate through text advertisement and or a design cut through the license plate frame itself providing a thin, appealing accessory to the motor vehicle enthusiast.

SUMMARY OF THE INVENTION

In view of the foregoing disadvantages inherent in the prior art, it has been observed that there is need for electroluminescent license plate frames that illuminate advertisement surface indicia imprinted along a part of the license plate frames.

The invention, an upgraded illuminated license plate frame, has a thinner design due to the method of recessing strip lighting that is placed in the back side of the license plate frame; the strip lighting is powered by a direct current inverter that is connected to a direct current power source. This allows you to add text for advertisement or even a design cut, machined, or molded through various types of materials the license plate frame is composed of, and light will illuminate through the area. It also allows for a wider variety of color depending on the colored film that is laid over the strip lighting. This also allows a wide variety of text fonts that can be cut, milled, stamped or molded though the license plate frame during its production. The text and design can be placed almost anywhere along the top, sides or bottom of the front of the license plate frame and will not change the thickness of the license plate frame.

Accordingly several objects and advantages of the invention are to provide an improved illuminated license plate frame, to provide increased visual cosmetic appeal, to provide a wider variety of color that can be illuminated through the text or design, to provide a wider variety of illuminated text advertisement font's and to also provide a thinner design of a motor vehicle accessory. Still further objects and advantages will become apparent from a study of the following description and the accompanying drawings.

An electroluminescent license plate frame for providing advertisement on a vehicle includes a front plate directly mounted to the vehicle, without the use of intervening elements, and has oppositely facing front and back portions respectively. A recessed pocket is formed within the front plate. An electroluminescent strip lighting is attached to positive and negative wires of a direct current power source of the vehicle, and is recessed into the back portion of the frame. A transparent and color tinted member is recessed between the strip lighting and the frame respectively. A direct current inverter receives power from the direct current power source and transmits the power to the strip lighting.

The apparatus includes surface indicia formed on the front portion of the frame. Such surface indicia include at least one of text indicia and design indicia respectively. A backing plate is attached to the front plate of the frame and is conveniently provided with an opening for receiving the lead wires therethrough. Such front and backing plates are coextensively shaped which is essential such that the plates present a uniform appearance to an observer. The strip lighting and the color tinted transparent member are held and sealed between the front and backing plates respectively which is critical such that the strip lighting and transparent member do not become prematurely disengaged from the plates during operating conditions.

The frame includes an upper center portion bearing the text indicia that passes through the frame to the recessed pocket so light can outwardly illuminate through the frame from the strip lighting. An upper left portion effectively bears the design indicia passing through the frame to the recessed pocket, which is crucial such that light outwardly illuminates through the frame from the strip lighting. Mounting holes drilled through the frame advantageously receive mounting hardware therethrough, which is vital such that the frame is securely attached to the vehicle.

The strip lighting is stacked on top of the color tinted transparent member so that the strip lighting effectively illuminates through the surface indicia and the design indicia respectively. The backing plate is statically engaged with the front plate, which is necessary such that the strip lighting advantageously remains fixedly disposed therebetween, and does not prematurely separate therefrom during driving conditions.

The surface indicia are conveniently located at a lower center portion of the frame. The text indicia effectively pass through the frame to the recessed pocket, which is necessary such that light outwardly illuminates through the frame from the strip lighting. Left and right corners of lower and upper portions of the frame are conveniently provided with mounting holes, which is essential for receiving mounting hardware therethrough and effectively attaching the frame to the vehicle. Such mounting hardware secures the frame to the vehicle and prevents premature separation of the frame from the vehicle during operating conditions.

Notably, a variety of embodiments are described hereinbelow. For example, the text indicia may be effectively disposed along a lower center portion of the frame, while the design indicia may be effectively disposed along a lower right portion of the frame. In an alternate embodiment, the text indicia may be disposed at an upper center portion of the frame. In yet another embodiment, multiple ones of the text indicia may be disposed at upper and lower center portions of the frame.

The present invention further includes a method for effectively displaying illuminated advertisement indicia on a vehicle license plate frame. Such a method includes the steps of mounting a front plate directly to the vehicle, without the use of intervening elements. Such a front plate has oppositely facing front and back portions respectively. The method further includes forming a recessed pocket within the front plate and attaching an electroluminescent strip lighting to positive and negative wires of a direct current power source of the vehicle. Such strip lighting is recessed into the back portion of the frame.

The method further includes recessing a color tinted transparent member between the strip lighting and the frame respectively, electrically coupling a direct current inverter to the strip lighting and the positive and negative wires for receiving power from the direct current power source and for transmitting the power to the strip lighting, and forming surface indicia on the front portion of the frame. Such surface indicia include at least one of a text indicia and a design indicia, respectively. The method further includes attaching a backing plate to the front plate of the frame wherein the back plate is provided with an opening for receiving the lead wires therethrough, and sealing the strip lighting and the color tinted transparent member between the front and backing plates respectively.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Embodiment 1

FIG. 5 is a top-side view of the electroluminescent license plate frame of FIG. 1; the bottom-side view is a mirror image of the top-side view of all embodiments and will not be shown again;

FIG. 6 is a left-side view of the electroluminescent license plate frame of FIG. 1; whereas the right-side view is a mirror image of the left-side view of all embodiments;

Embodiment 2

Figure 7:
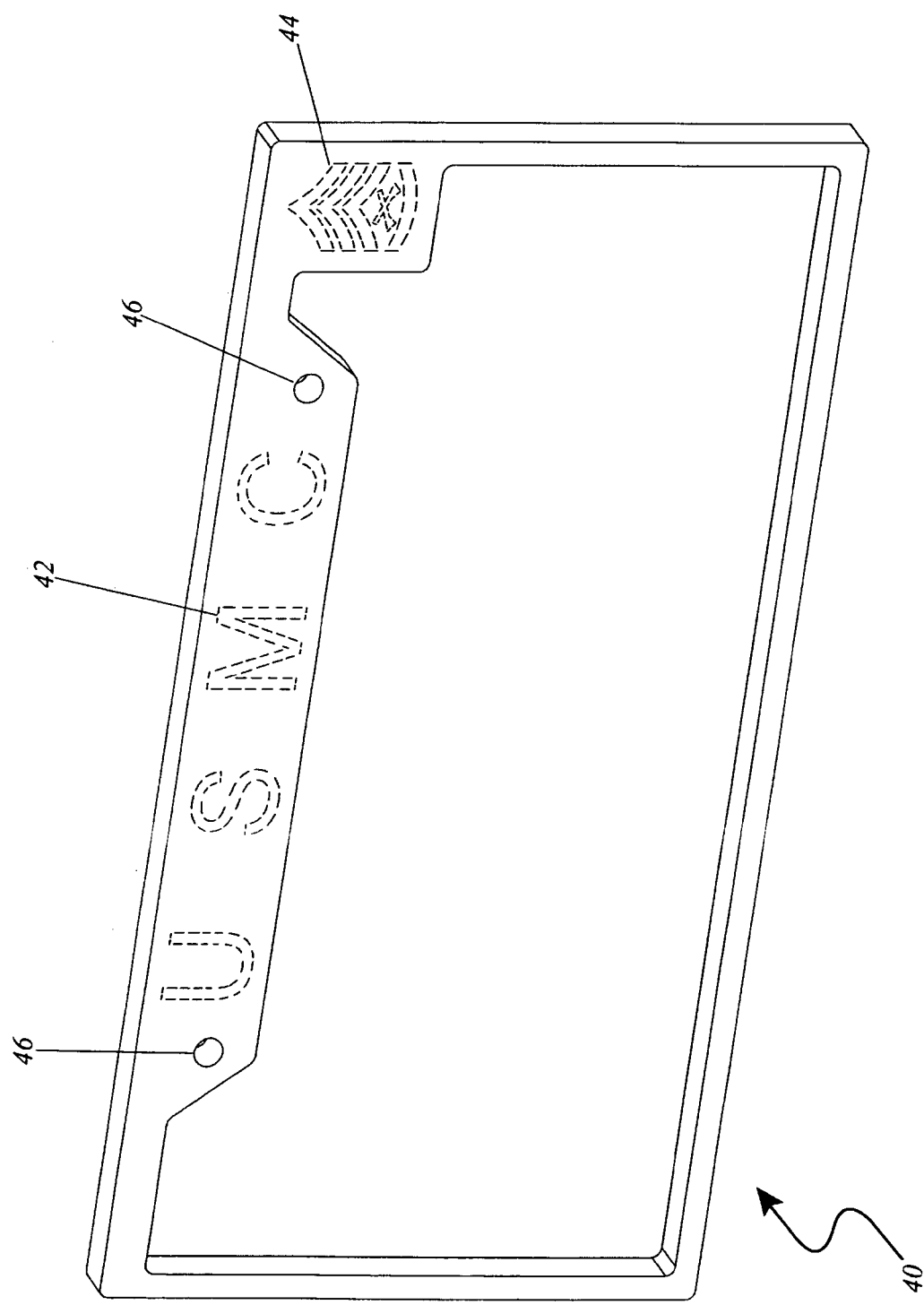
Figure 8:
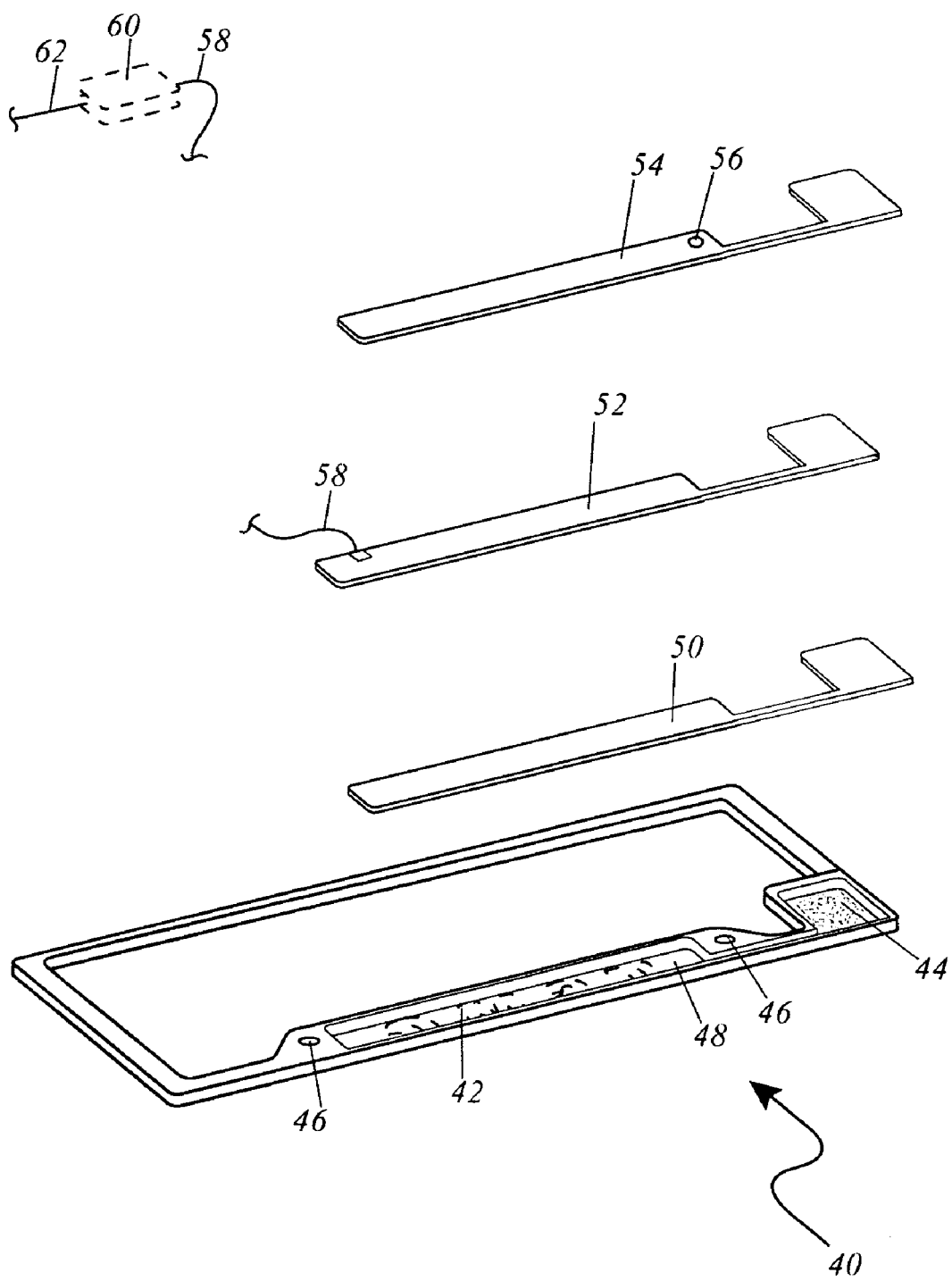
Figure 9:
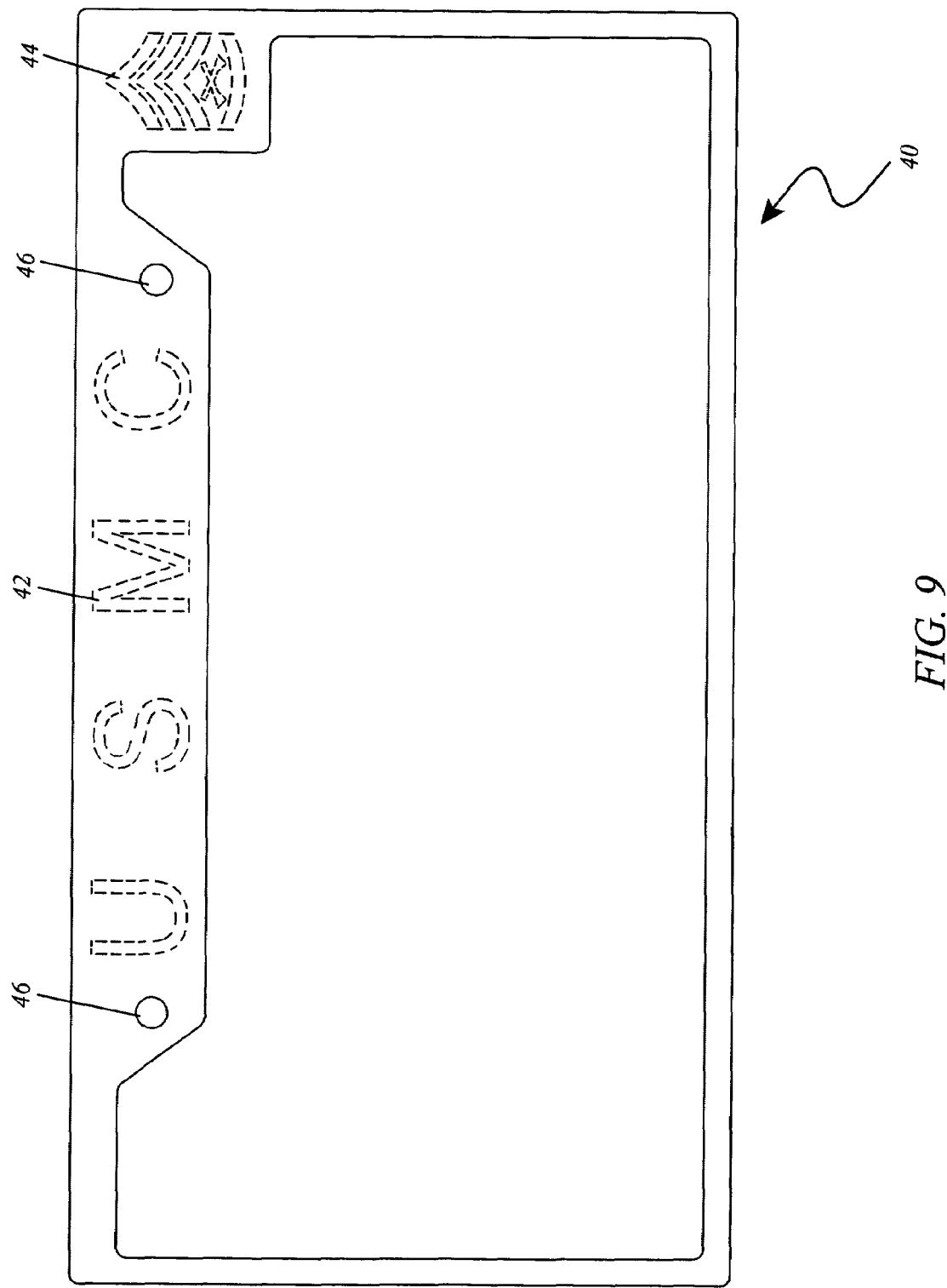
Figure 10:
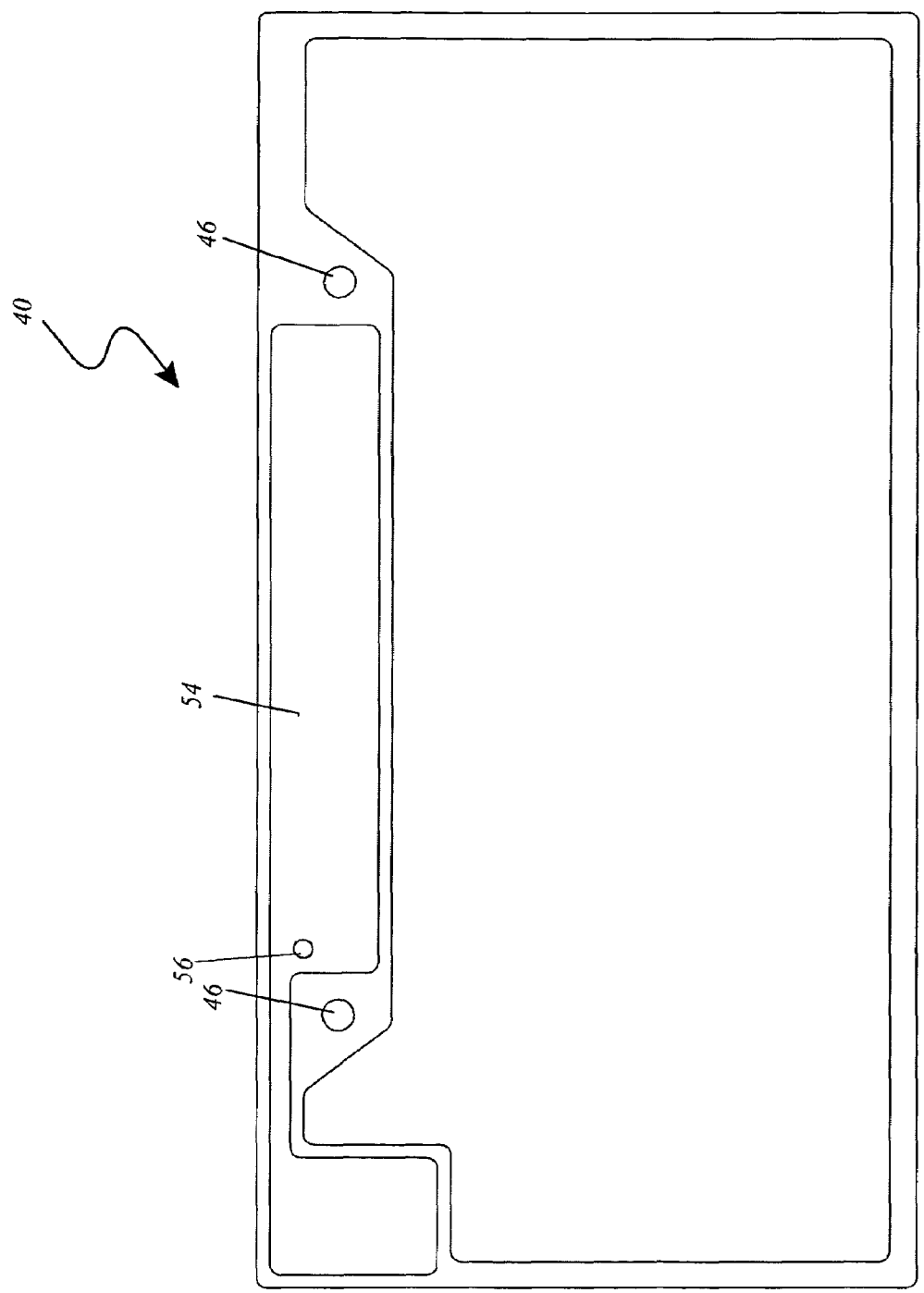

FIG. 7 is a perspective front-side view of an electroluminescent license plate frame in accordance with the invention;

FIG. 8 is a perspective exploded back-side view of the electroluminescent license plate frame of FIG. 7;

FIG. 9 is a front-side view of the electroluminescent license plate frame of FIG. 7;

FIG. 10 is a back-side view of the electroluminescent license plate frame of FIG. 7;

Embodiment 3

Figure 11:
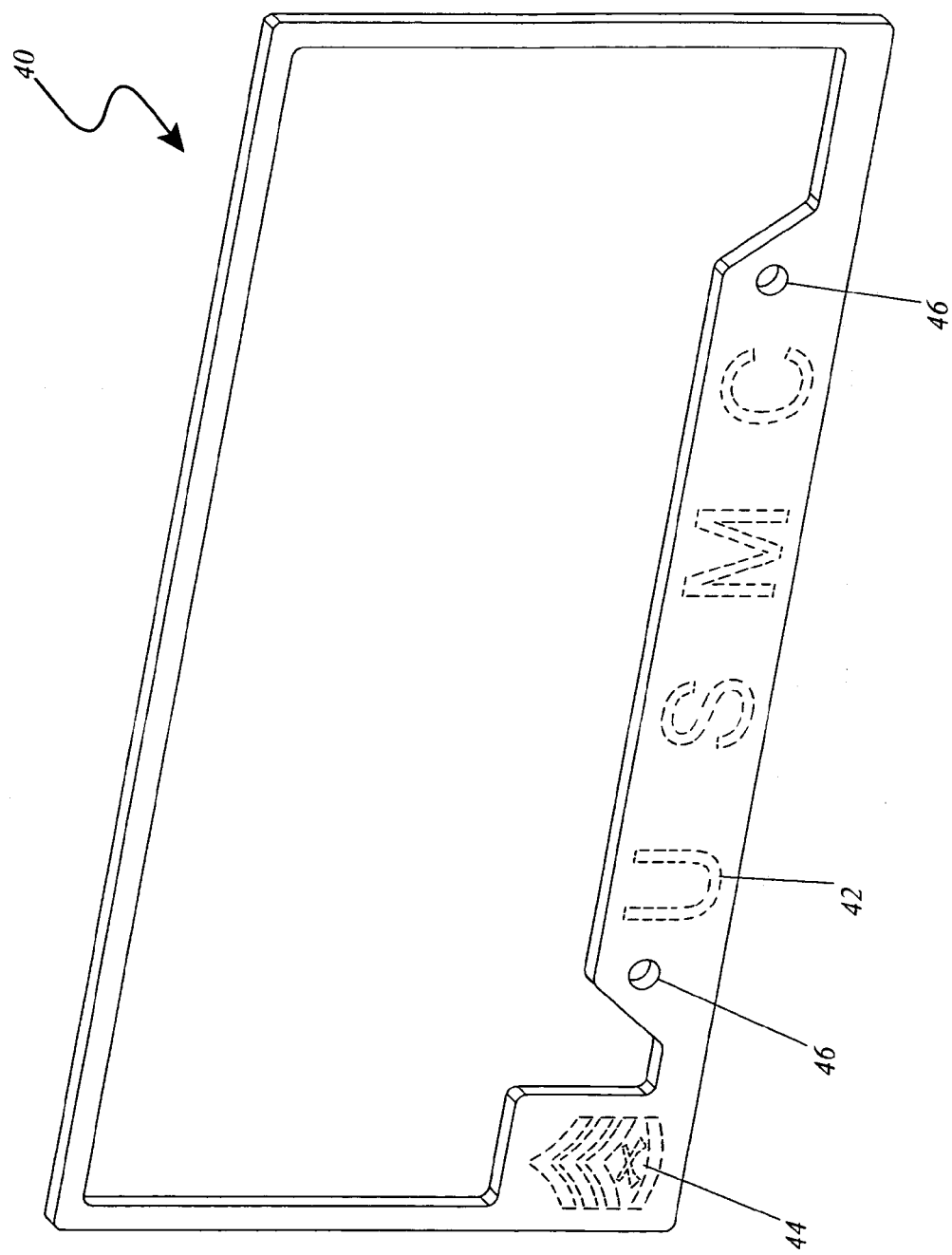
Figure 12:
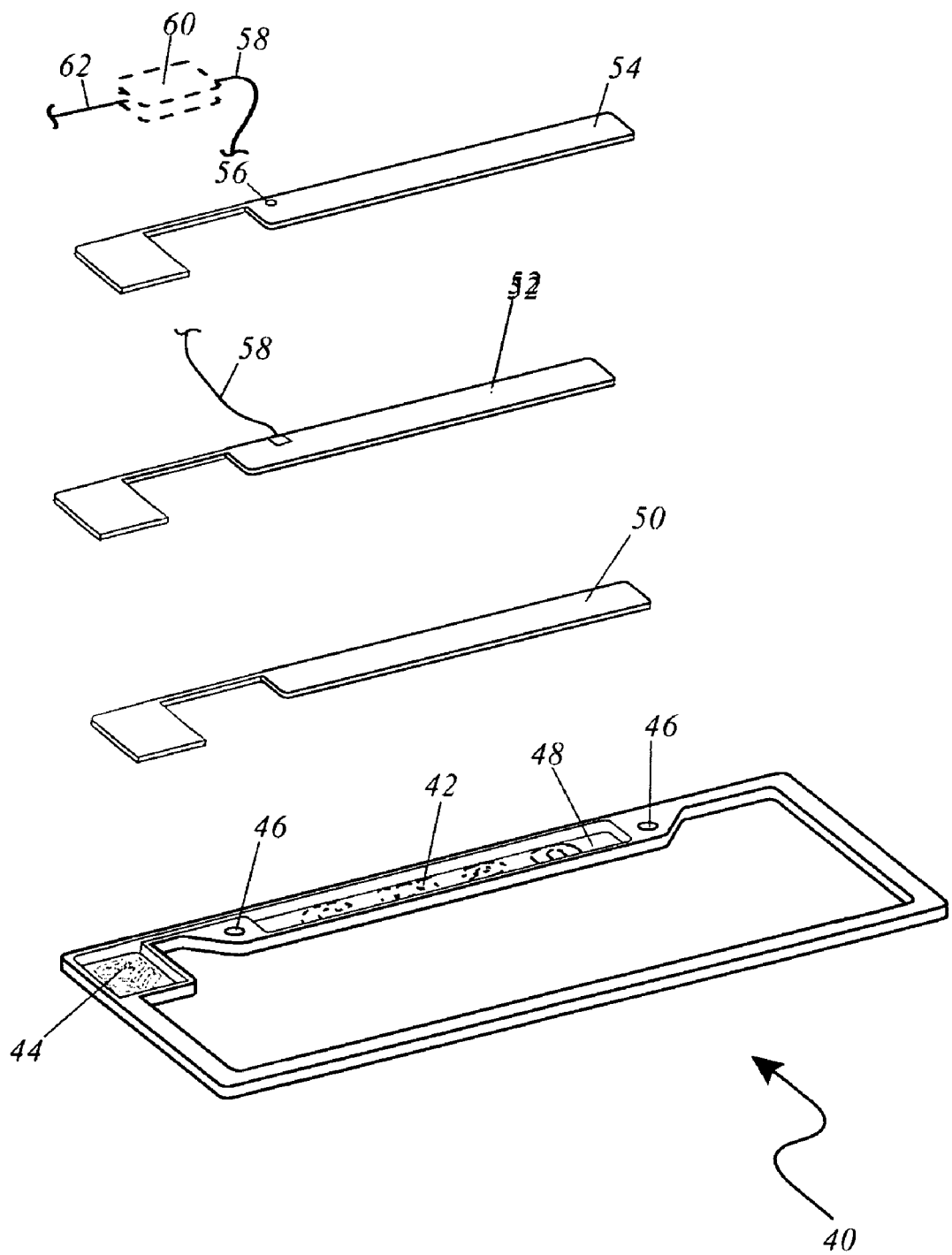
Figure 13:
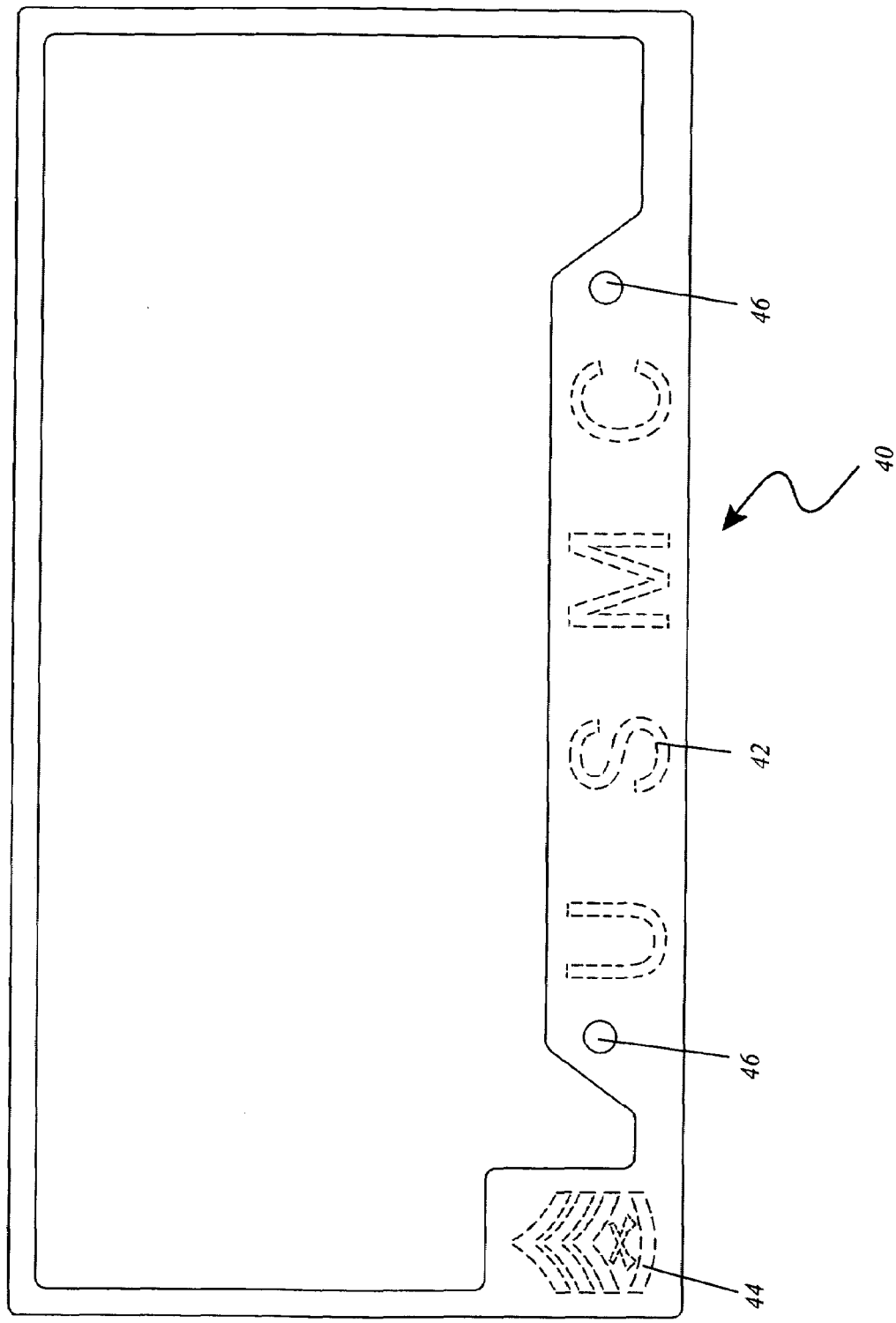
Figure 14:
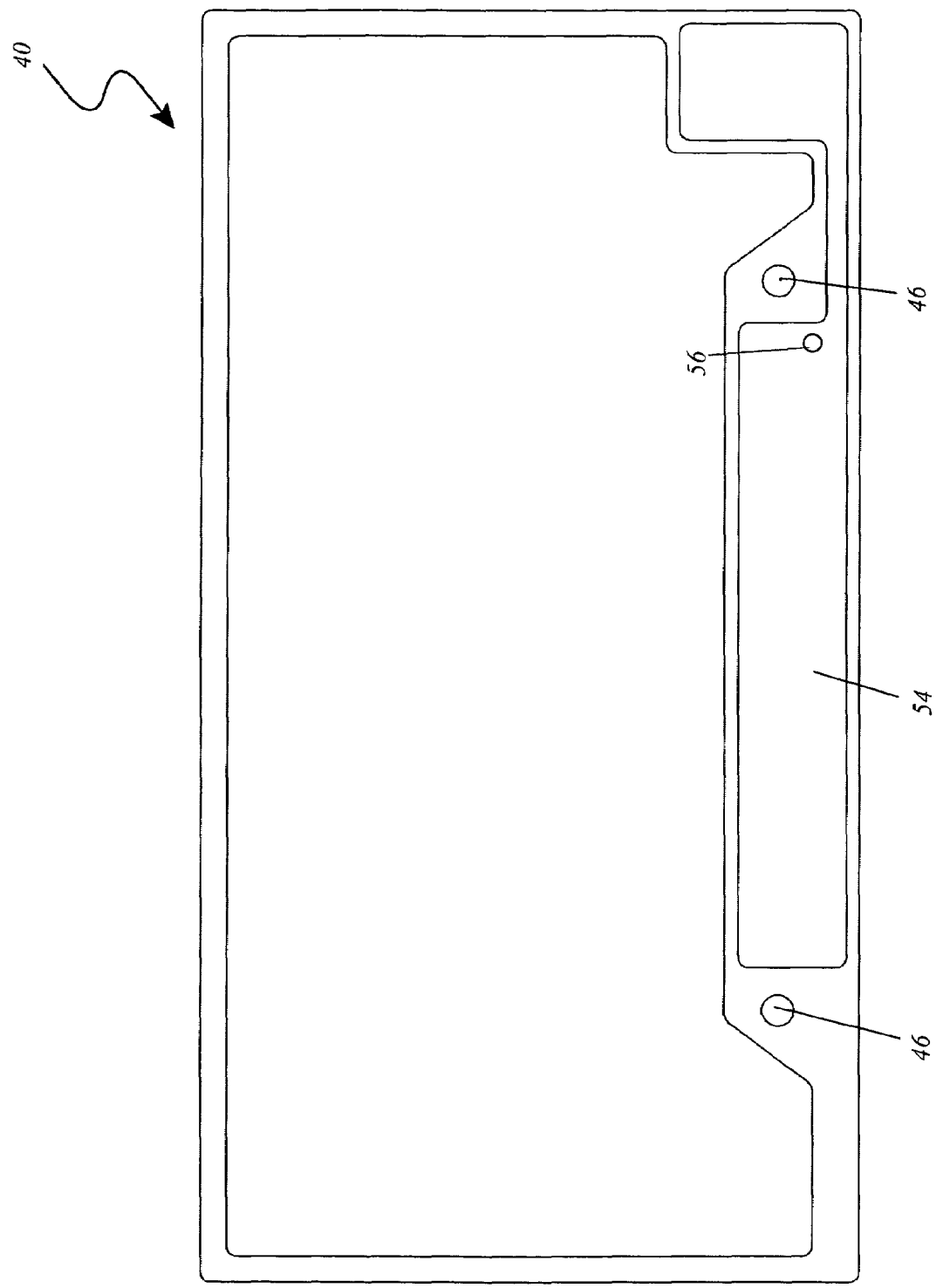

FIG. 11 is a perspective front-side view of an electroluminescent license plate frame in accordance with the invention;

FIG. 12 is a perspective exploded back-side view of the electroluminescent license plate frame of FIG. 11;

FIG. 13 is a front-side view of the electroluminescent license plate frame of FIG. 11;

FIG. 14 is a back-side view of the electroluminescent license plate frame of FIG. 11;

Embodiment 4

Figure 15:
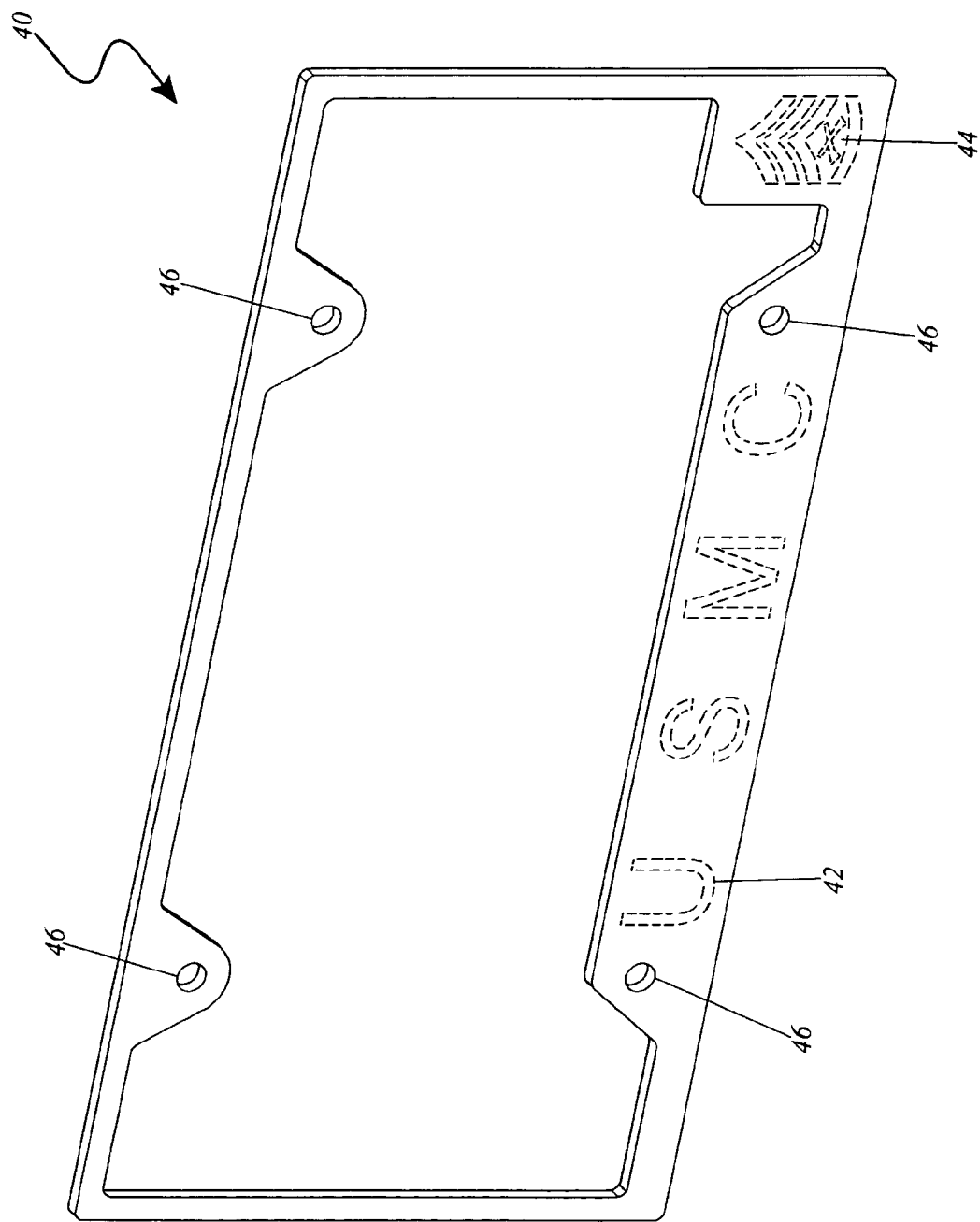
Figure 16:
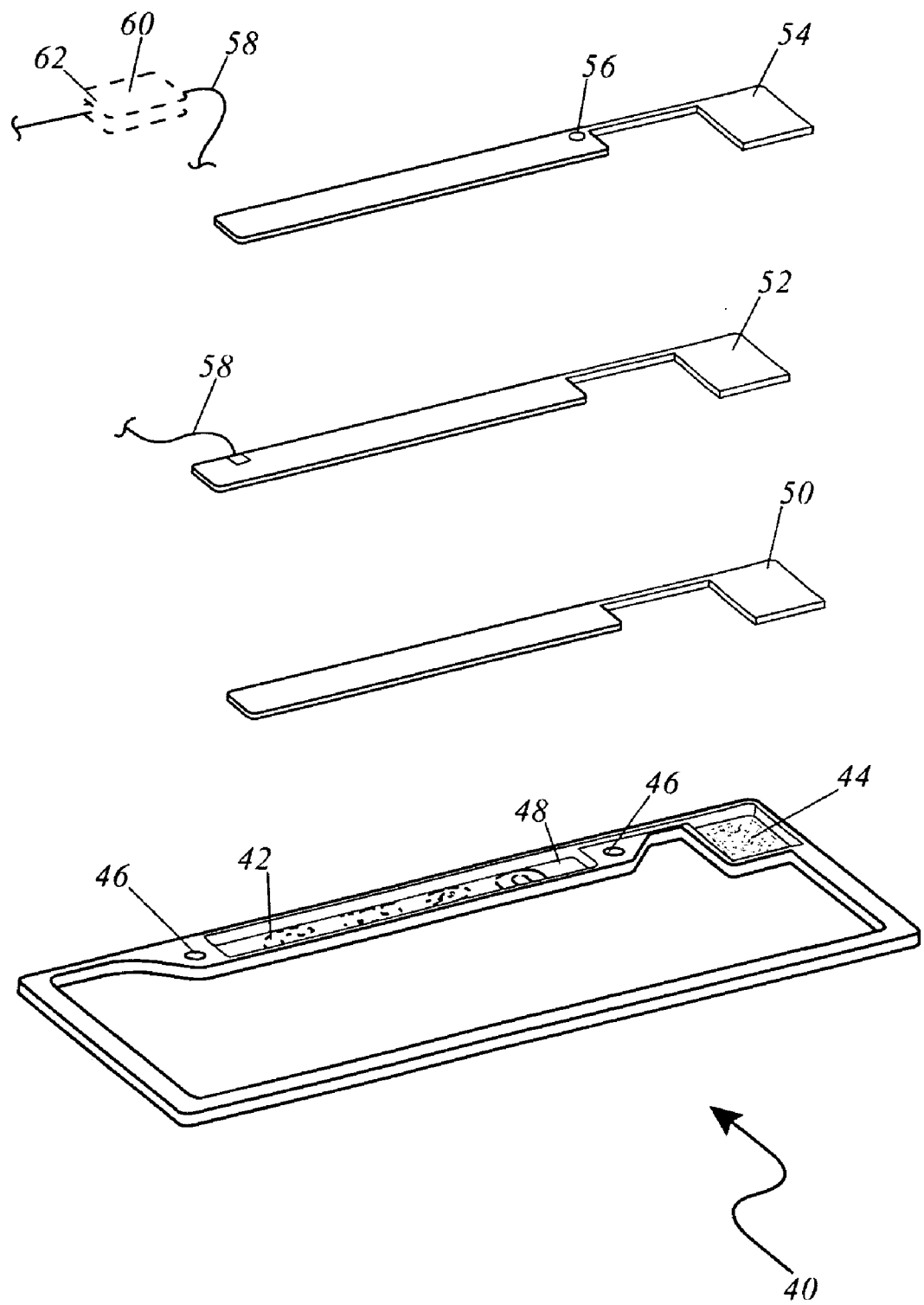
Figure 17:
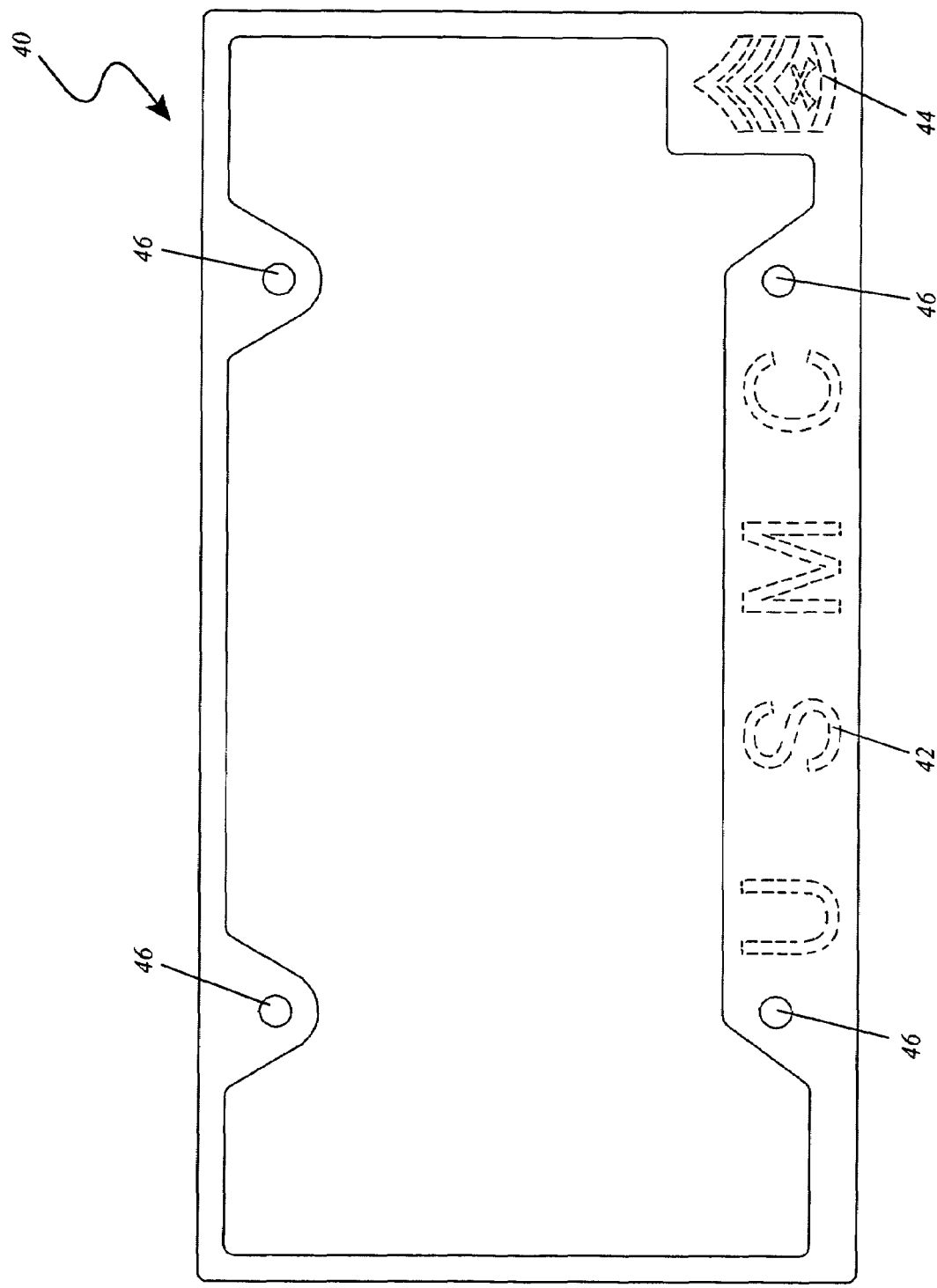
Figure 18:
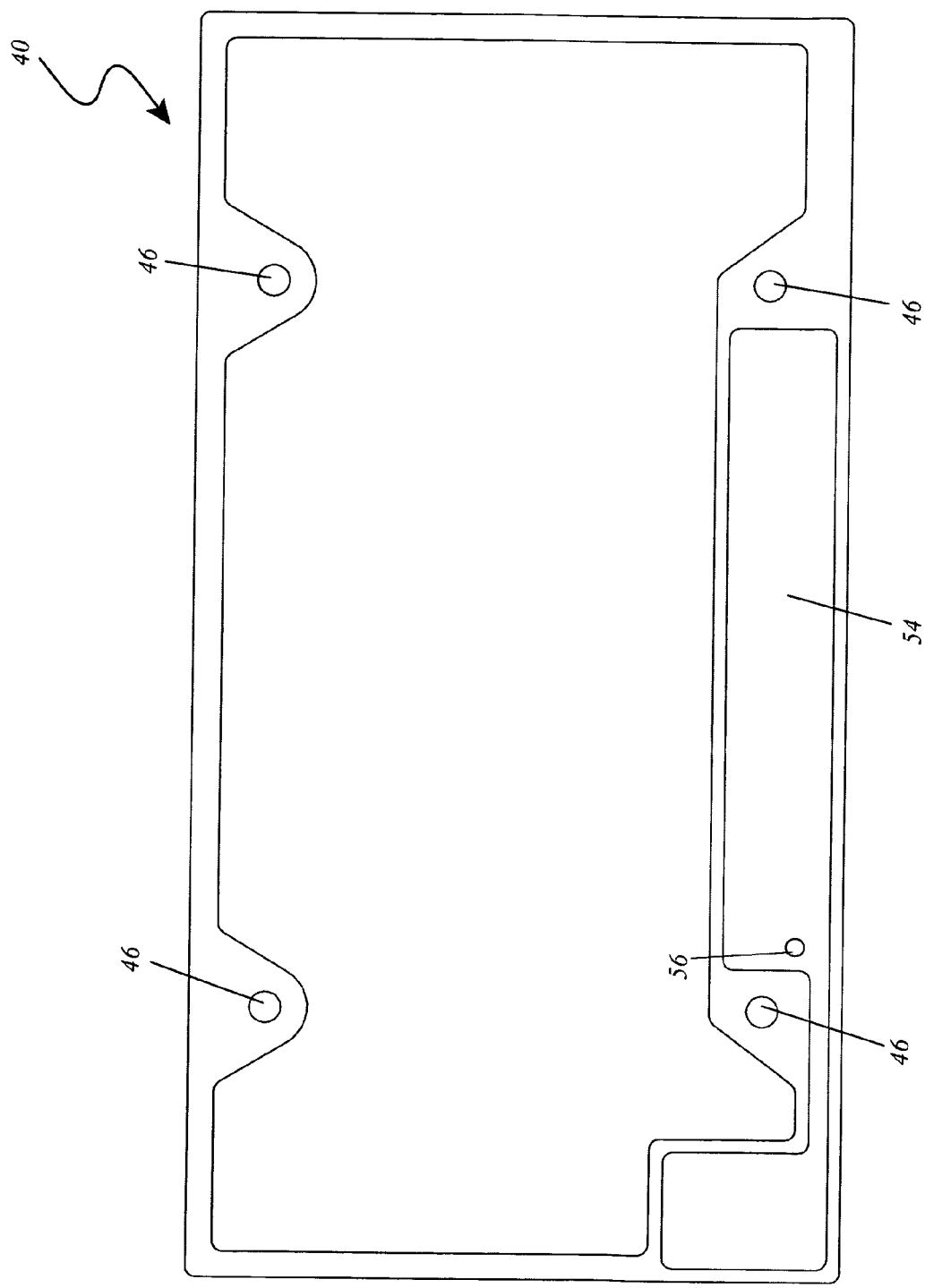

FIG. 15 is a perspective front-side view of an electroluminescent license plate frame in accordance with the invention;

FIG. 16 is a perspective exploded back-side view of the electroluminescent license plate frame of FIG. 15;

FIG. 17 is a front-side view of the electroluminescent license plate frame of FIG. 15;

FIG. 18 is a back-side view of the electroluminescent license plate frame of FIG. 15;

Embodiment 5

Figure 19:
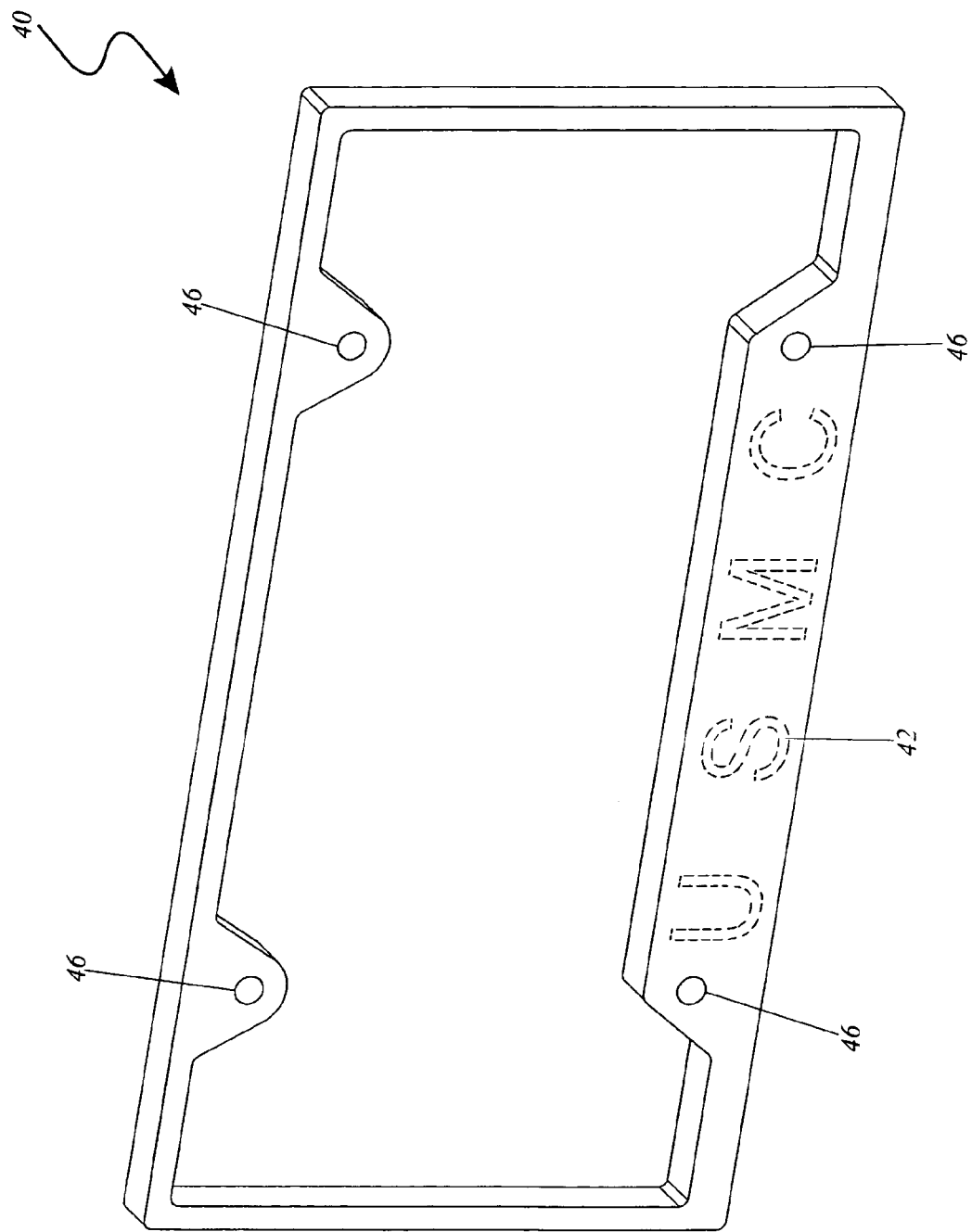
Figure 20:
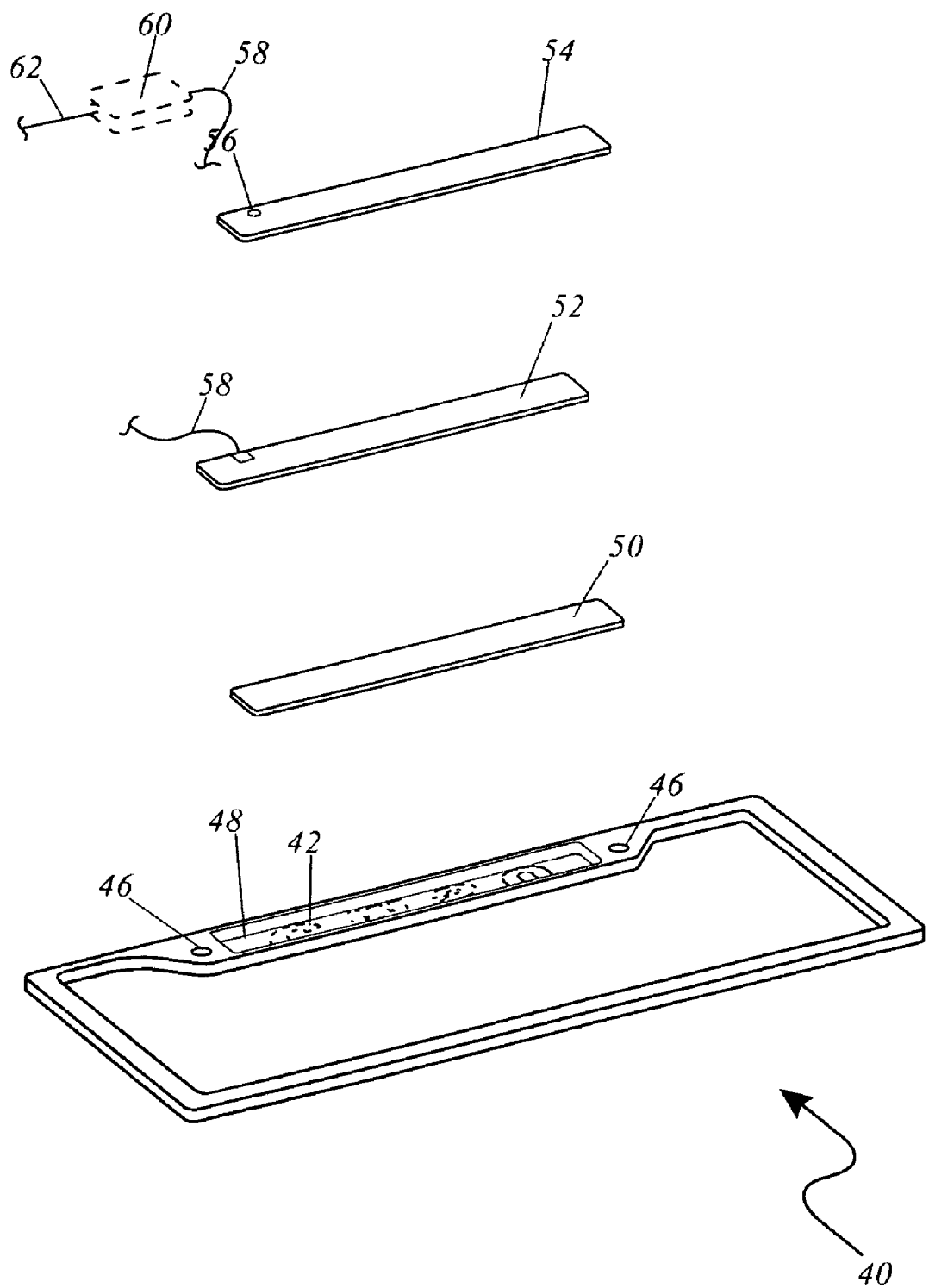
Figure 21:
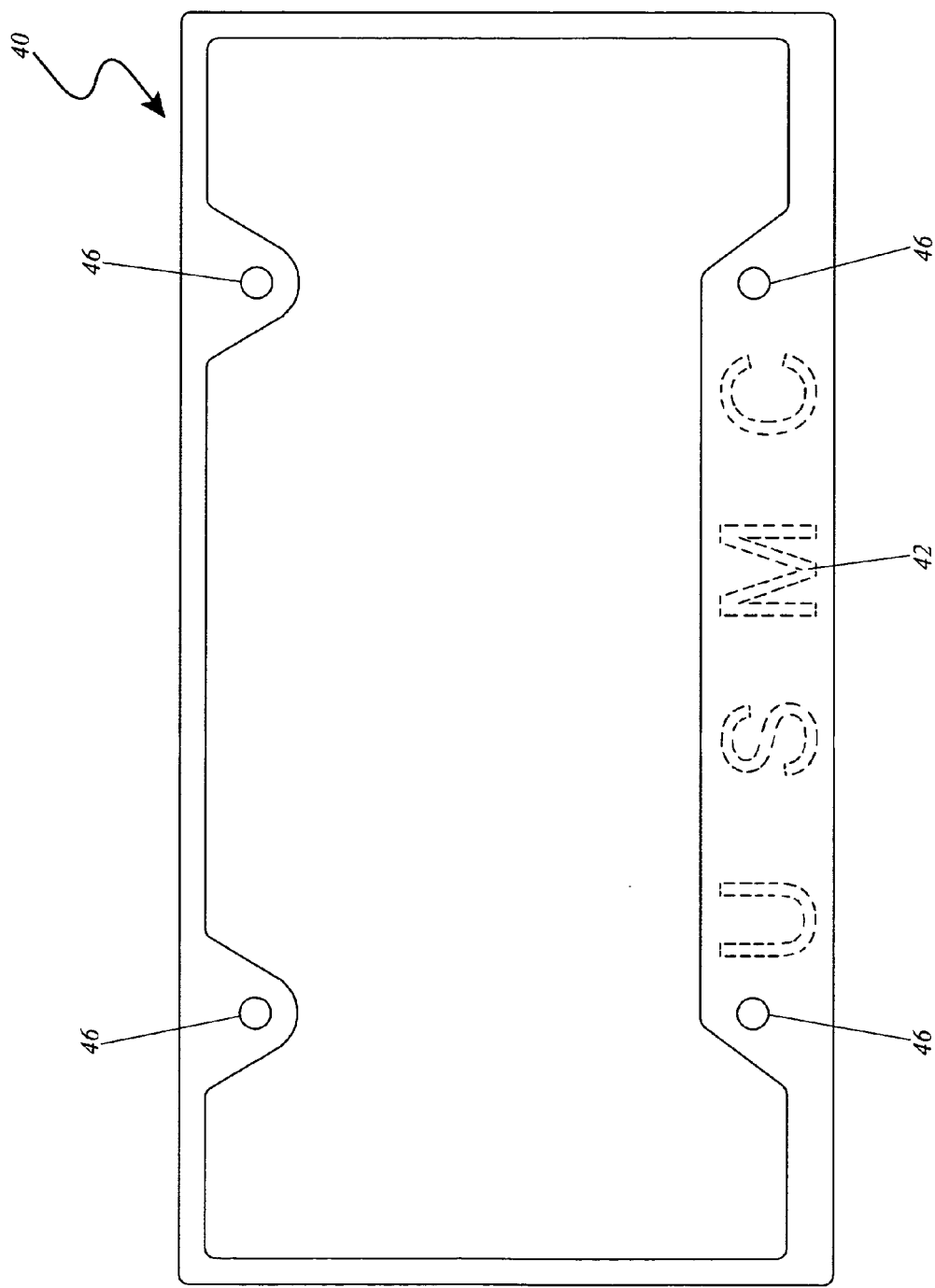
Figure 22:
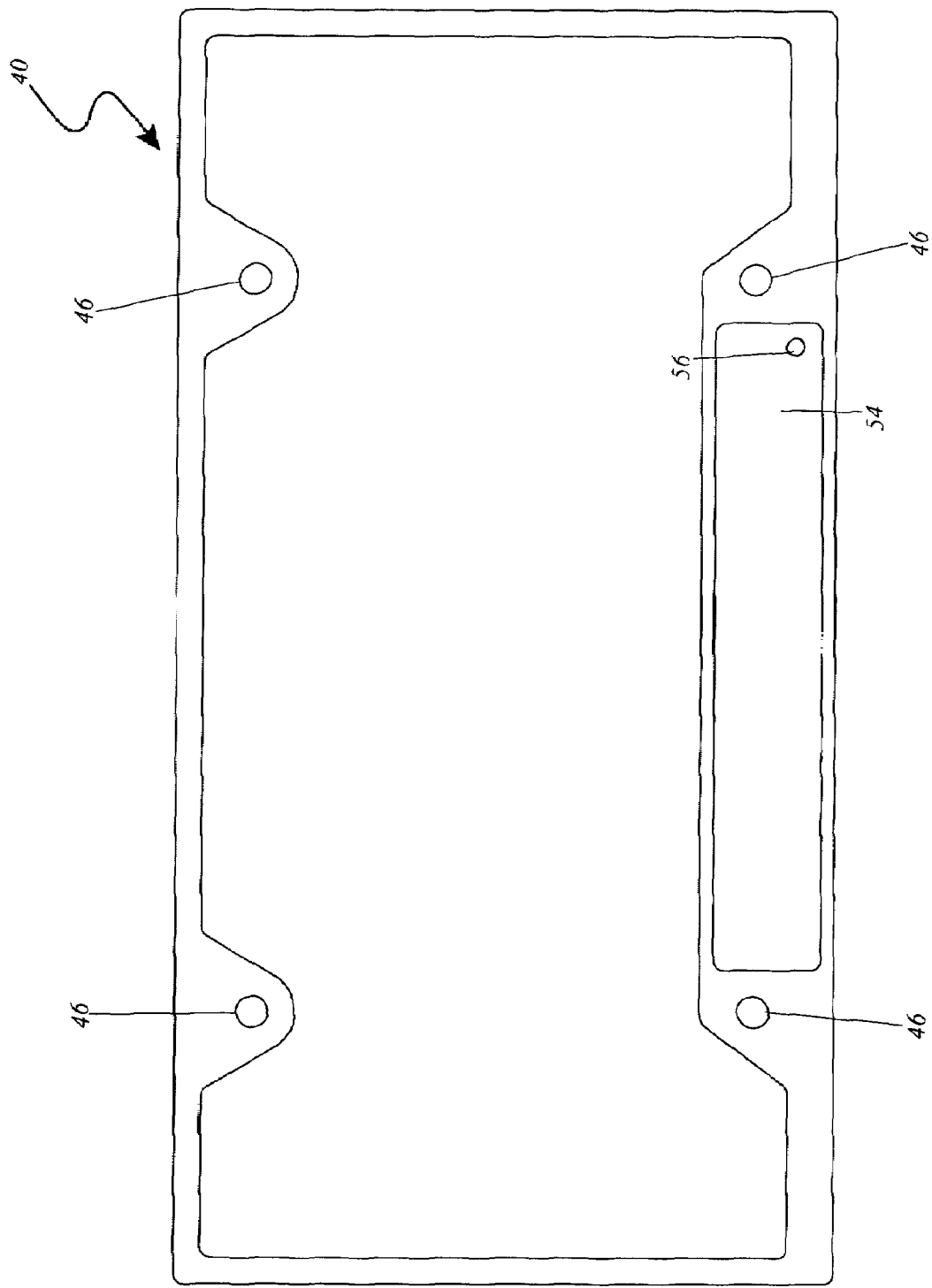

FIG. 19 is a perspective front-side view of an electroluminescent license plate frame in accordance with the invention;

FIG. 20 is a perspective exploded back-side view of the electroluminescent license plate frame of FIG. 19;

FIG. 21 is a front-side view of the electroluminescent license plate frame of FIG. 19;

FIG. 22 is a back-side view of the electroluminescent license plate frame of FIG. 19;

Embodiment 6

Figure 23:
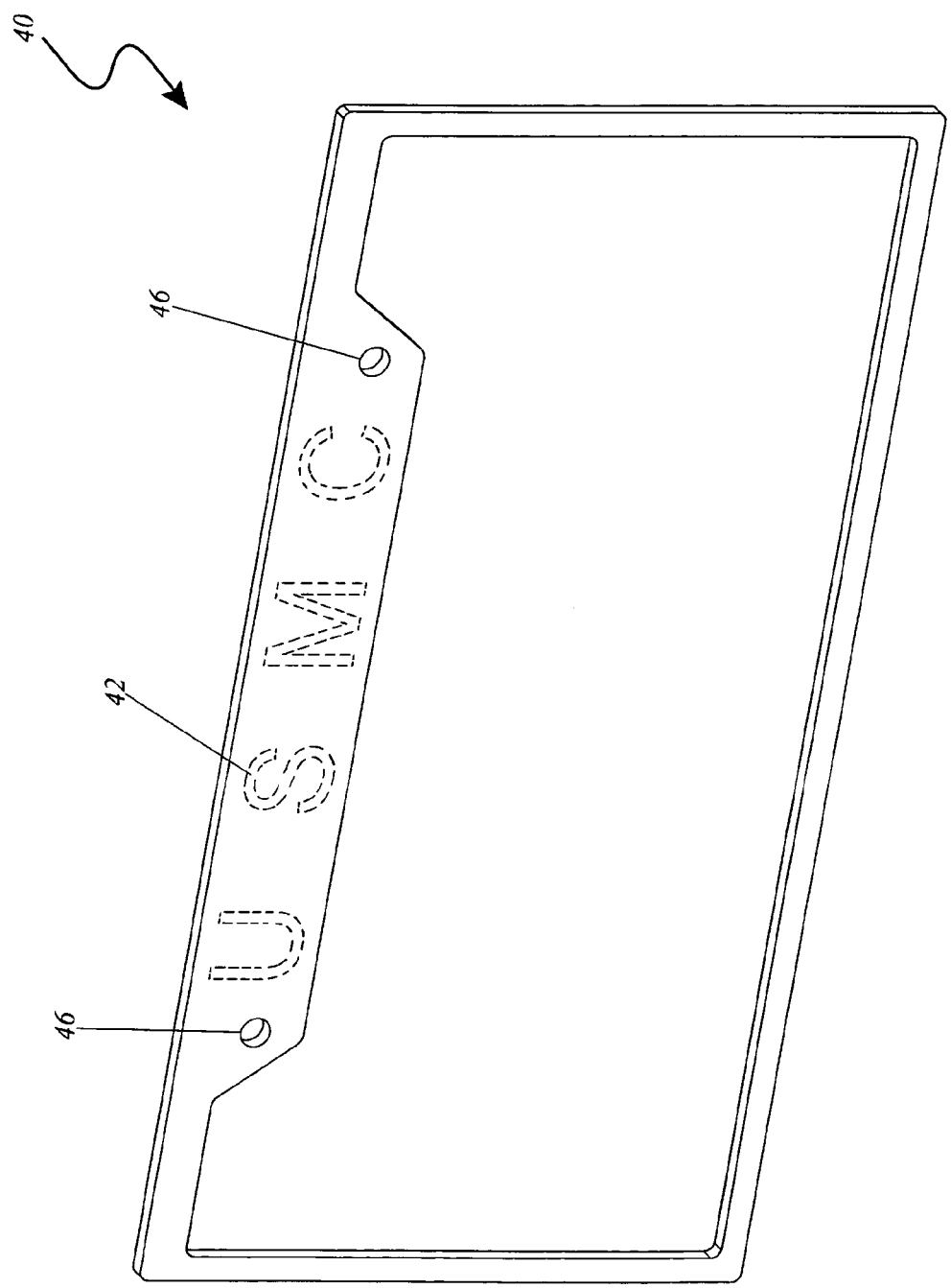
Figure 24:
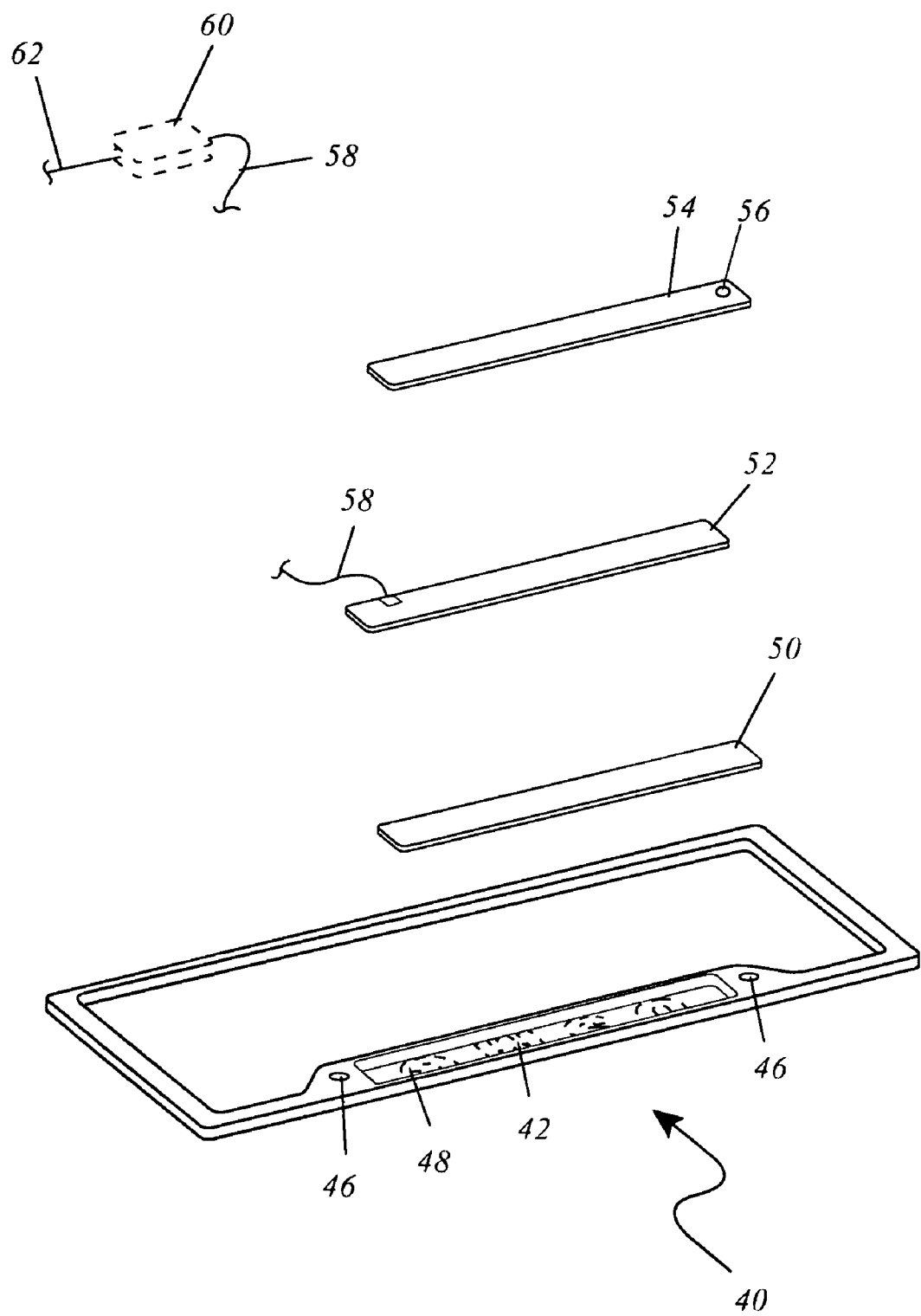
Figure 25:
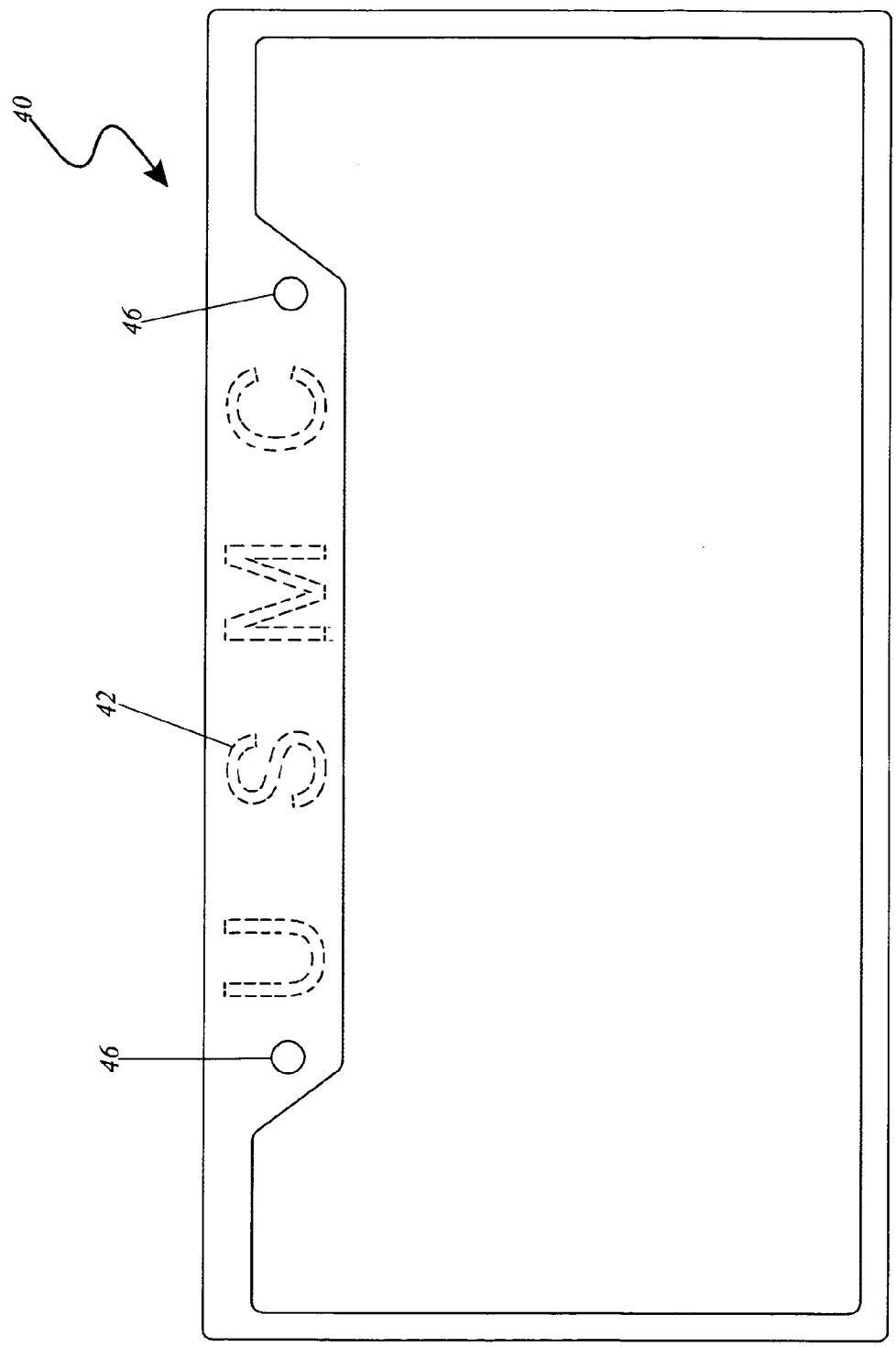
Figure 26:
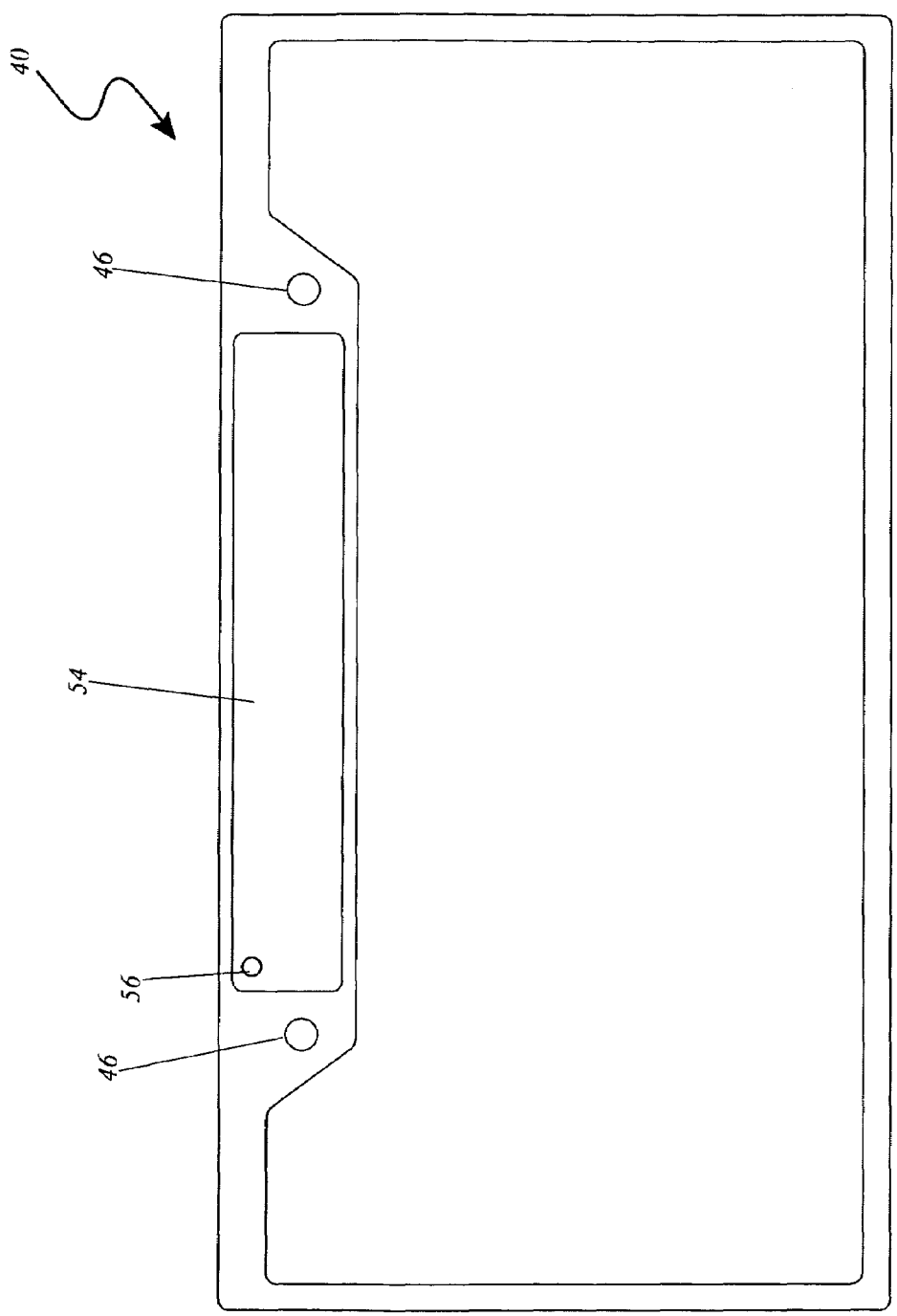

FIG. 23 is a perspective front-side view of an electroluminescent license plate frame in accordance with the invention;

FIG. 24 is a perspective exploded back-side view of the electroluminescent license plate frame of FIG. 23;

FIG. 25 is a front-side view of the electroluminescent license plate frame of FIG. 23;

FIG. 26 is a back-side view of the electroluminescent license plate frame of FIG. 23;

Embodiment 7

Figure 27:
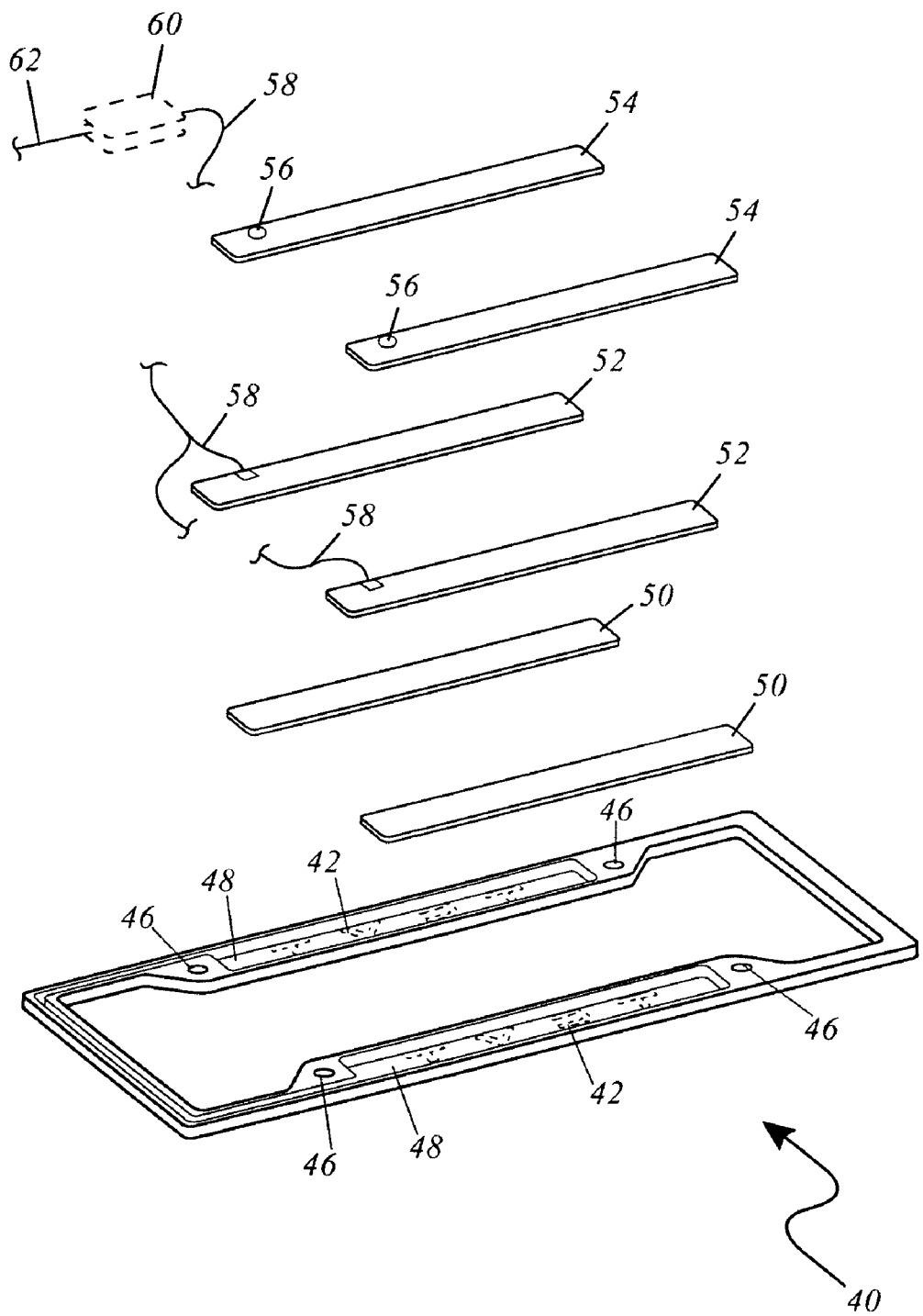
Figure 28:
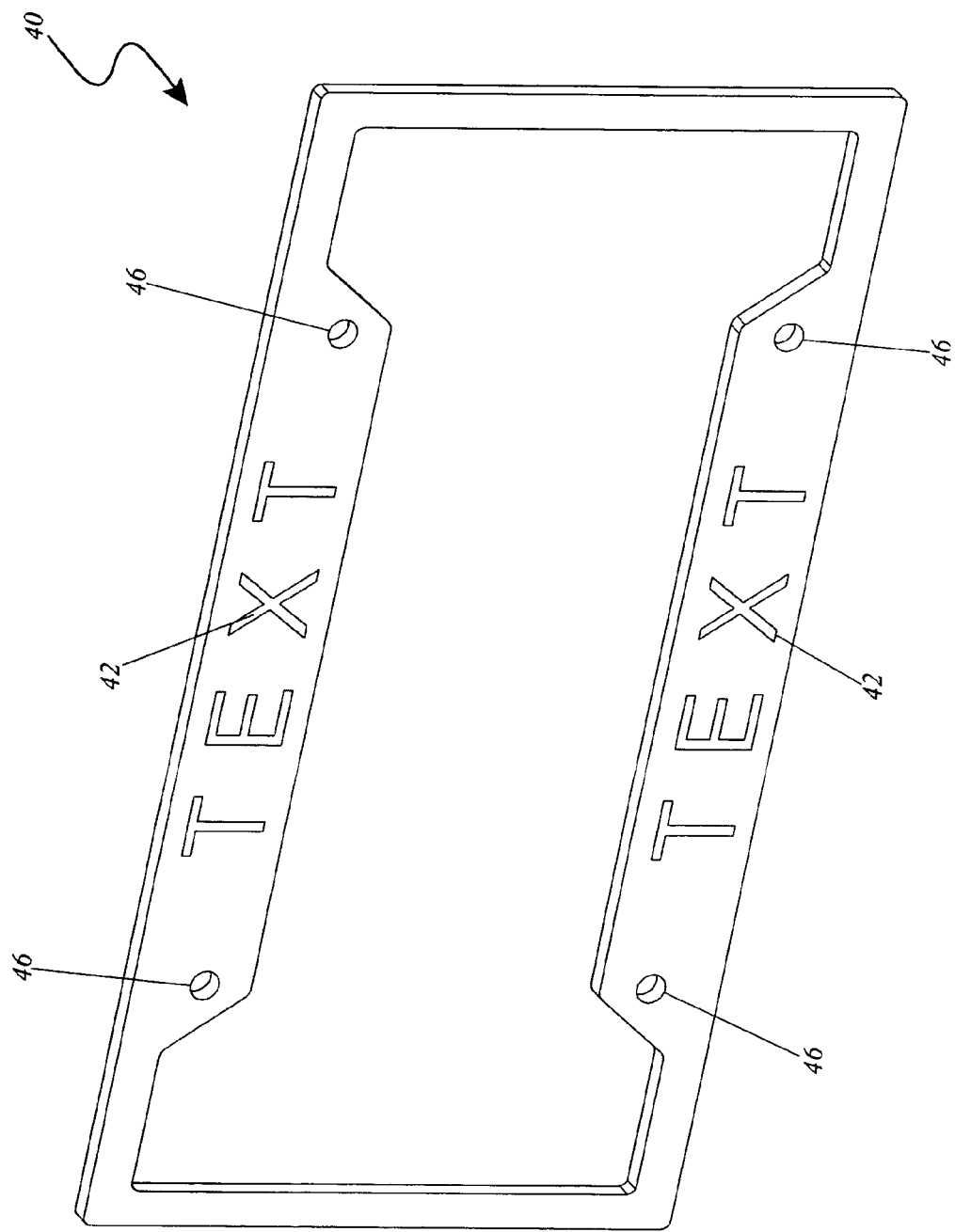
Figure 29:
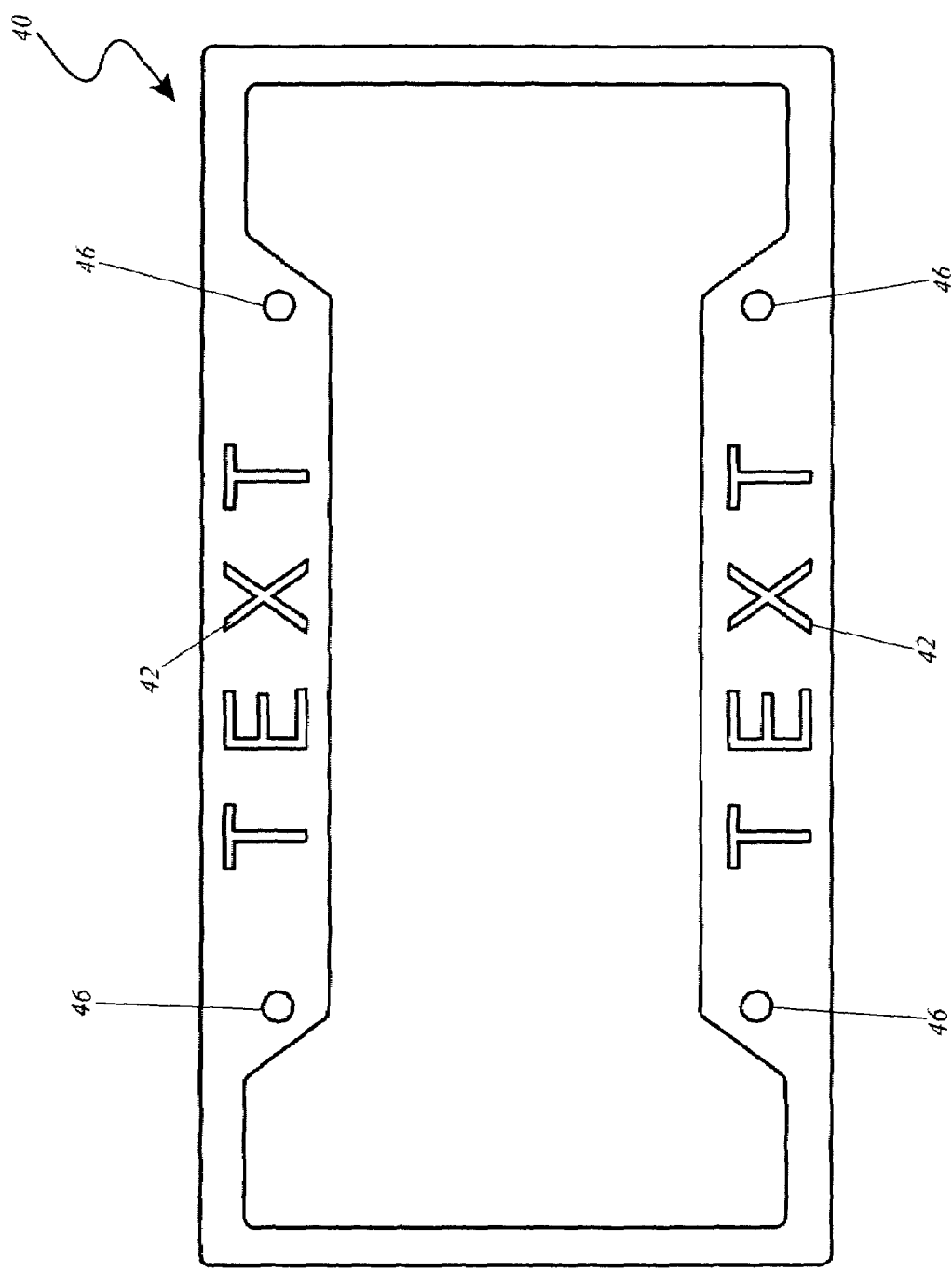
Figure 30:
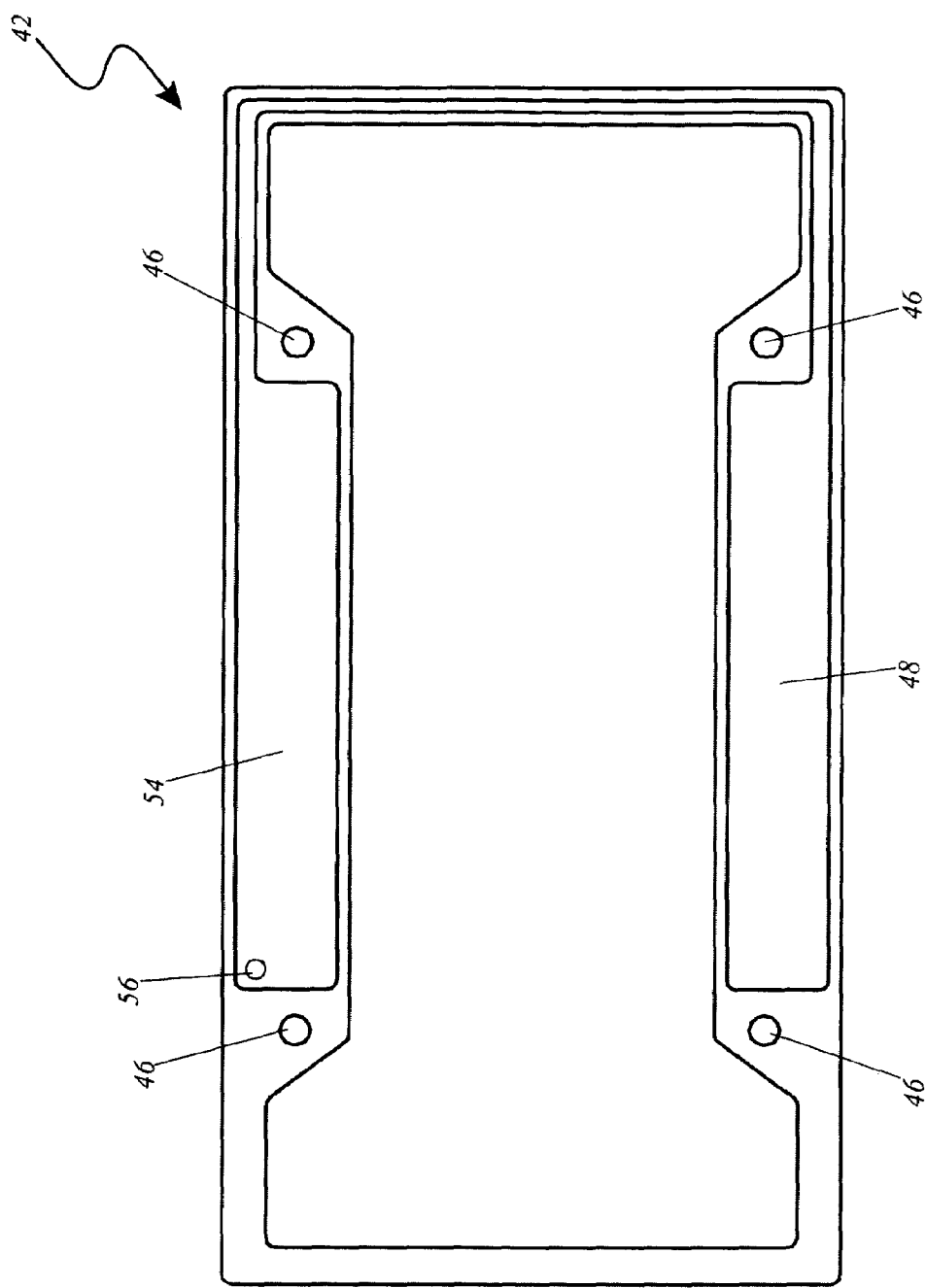

FIG. 27 is a perspective back-side view of an electroluminescent license plate frame in accordance with the invention;

FIG. 28 is a perspective exploded front-side view of the electroluminescent license plate frame of FIG. 27;

FIG. 29 is a front-side view of the electroluminescent license plate frame of FIG. 27; and, FIG. 30 is a back-side view of the electroluminescent license plate frame of FIG. 27.

DESCRIPTIVE KEY

| | |
|---|---|
| 40 | electroluminescent license plate frame |
| 42 | text advertisement |
| 44 | design |
| 46 | mounting holes |
| 48 | recessed pocket |
| 50 | color tinted transparent material |
| 52 | electroluminescent strip lighting |
| 54 | backing plate |
| 56 | lead wire hole |
| 58 | lead wire |
| 60 | direct current inverter |
| 62 | lead wires |

DETAILED DESCRIPTION OF THE PREFERRED EMBODIMENT

The best mode for carrying out the invention is presented in terms of its preferred embodiment, herein depicted within FIGS. 1 through 30. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Embodiment 1

Figure 1:
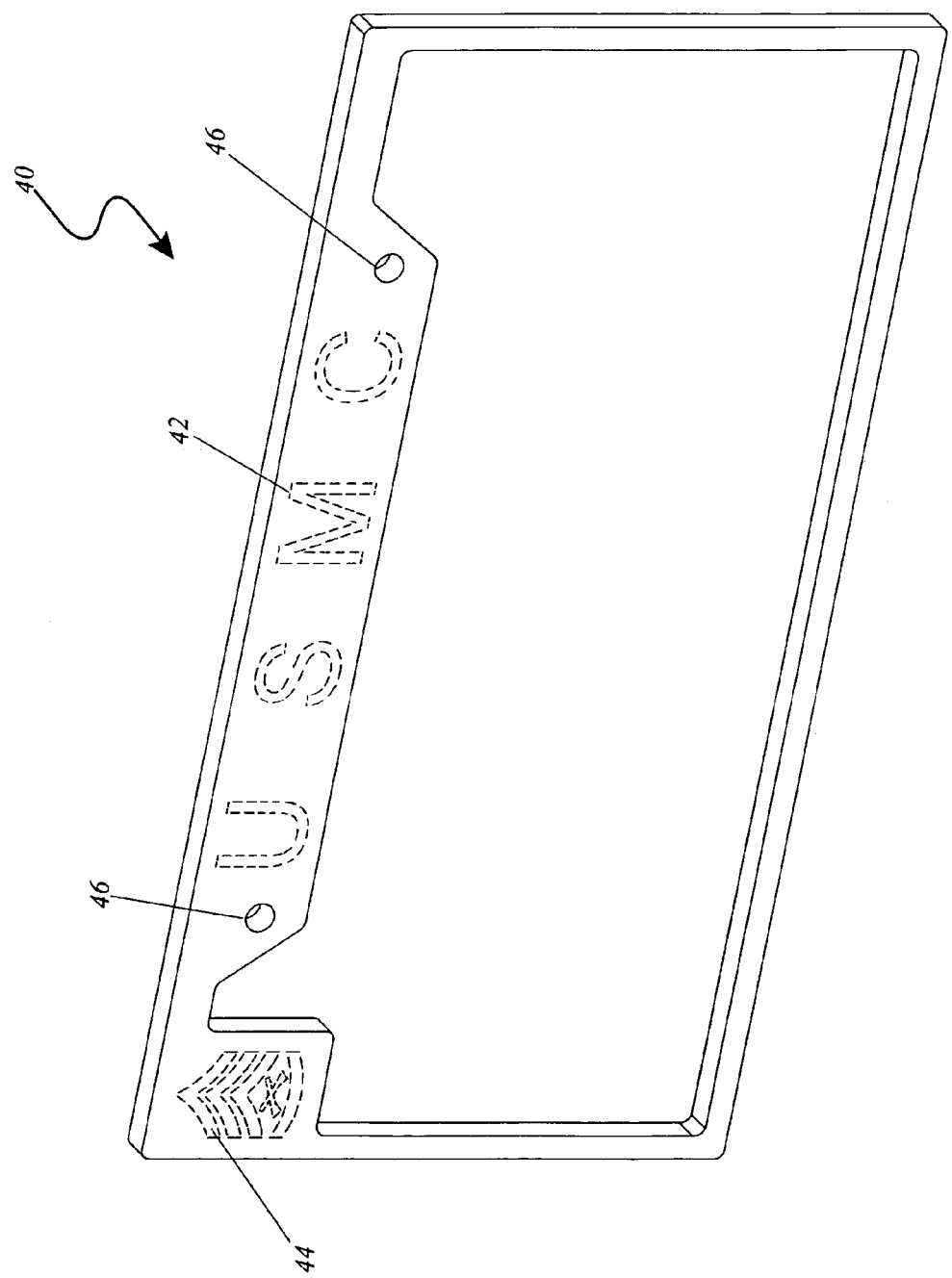
FIG. 1 is a perspective front-side view of an electroluminescent license plate frame in accordance with the invention.

FIG. 1 is a perspective view taken from the users front-side of the electroluminescent license plate frame (40) constructed in accordance with the invention. The upper center portion of the frame has an area for text advertisement (42) that goes all the way through the frame to the recessed pocket (not shown in this FIG.) so light can illuminate through the frame from electroluminescent strip lighting (not shown in this FIG.). This can be done by use of a milling machine, CNC machine, or molded through the frame during the production process. USMC is used as an example. The upper left portion of the frame is an area for a design (44) that goes all the way through the frame to the recessed pocket (not shown in this FIG.) so light can illuminate through the frame from electroluminescent strip lighting (not shown in this FIG.) This can be done by use of a milling machine, CNC machine, or molded through the frame during the production process. A military rank insignia is used as an example. Both of the electroluminescent lighting strips receive power from a direct current inverter through lead wires (not shown in this FIG.). The upper portion to the right and to the left of the text advertisement (42) are mounting holes (46) that are drilled through the frame for the mounting hardware that would attach the frame to a motor vehicle.

Figure 2:
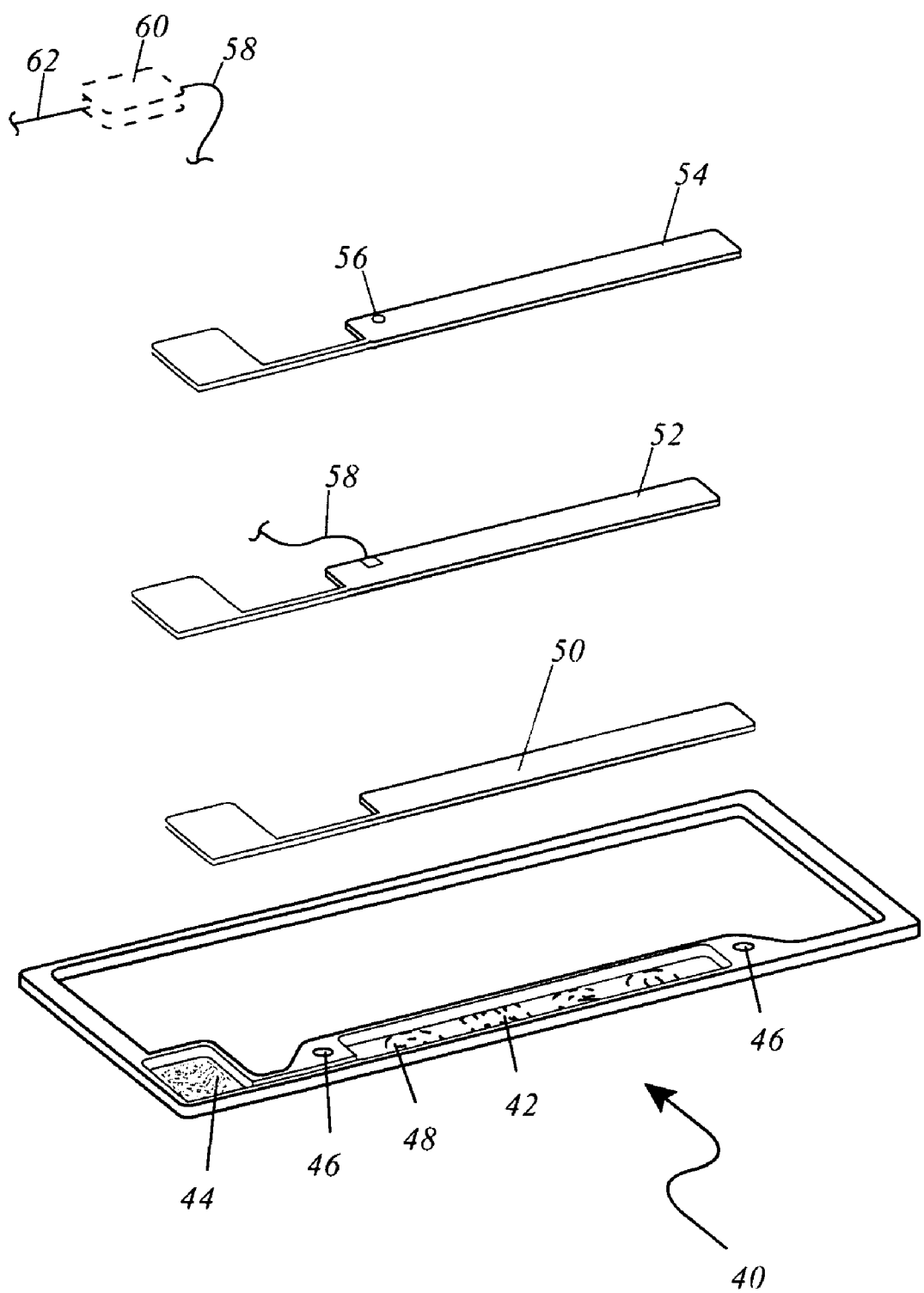
FIG. 2 is a perspective exploded back-side view of the electroluminescent license plate frame of FIG. 1.

FIG. 2 is a perspective exploded back-side view of the electroluminescent license plate frame (40). The upper center portion of the frame is the text advertisement (42) that goes through the frame to the recessed pocket (48). The upper right portion of the frame is the area for the design (44) that goes all the way through the frame to the recessed pocket (48). The recessed area is the pocket where the color tinted transparent material (50) is placed into. The electroluminescent strip lighting (52) is stacked on top of the color tinted transparent material (50) so the electroluminescent strip lighting will illuminate through the text advertisement (42) and the design (44). The lead wire (58), which is connected to electroluminescent strip lighting (52) passes through the lead wire hole (56) that is drilled through the backing plate (54). The backing plate is held in place to cap, seal and protect the contents in the recessed pocket (48) by use of a sealant or screws. The lead wires (58) run to the direct current inverter (60). Attached to the left side of the inverter are the lead wires (62) that are to be attached to a motor vehicle's direct current power source. The area to the left and right of the text advertisement (42) are the mounting holes (46) to mount the frame to a vehicle.

Figure 3:
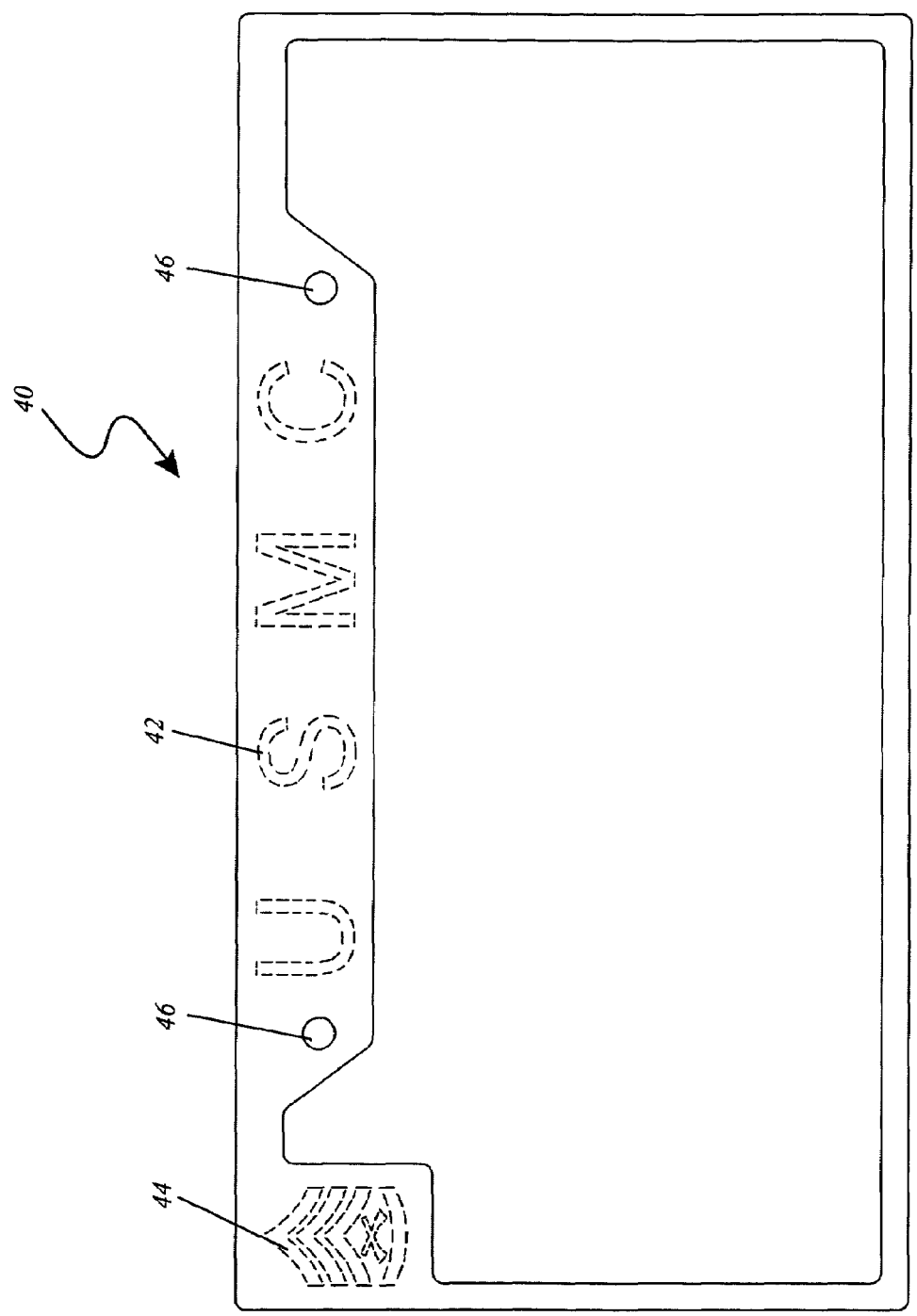
FIG. 3 is a front-side view of the electroluminescent license plate frame of FIG. 1.

FIG. 3 is a front-side view of the electroluminescent license plate frame (40). The upper center portion of the frame has an area for text advertisement (42) that goes all the way through the frame to the recessed pocket (not shown in this FIG.) so light can illuminate through the text advertisement (42) from electroluminescent strip lighting (not shown in this FIG.). USMC is used as an example. The upper left portion of the frame is an area for a design (44) that goes all the way through the frame to the recessed pocket (not shown in this FIG.) so light can illuminate through the frame from electroluminescent strip lighting (not shown in this FIG.). A military rank insignia is used as an example. Both of the electroluminescent lighting strips receive power from a direct current inverter through lead wires (not shown in this FIG.). The upper portion to the right and to the left of the text advertisement (42) are mounting holes (46) that are drilled through the frame for the mounting hardware that would attach the frame to a motor vehicle.

Figure 4:
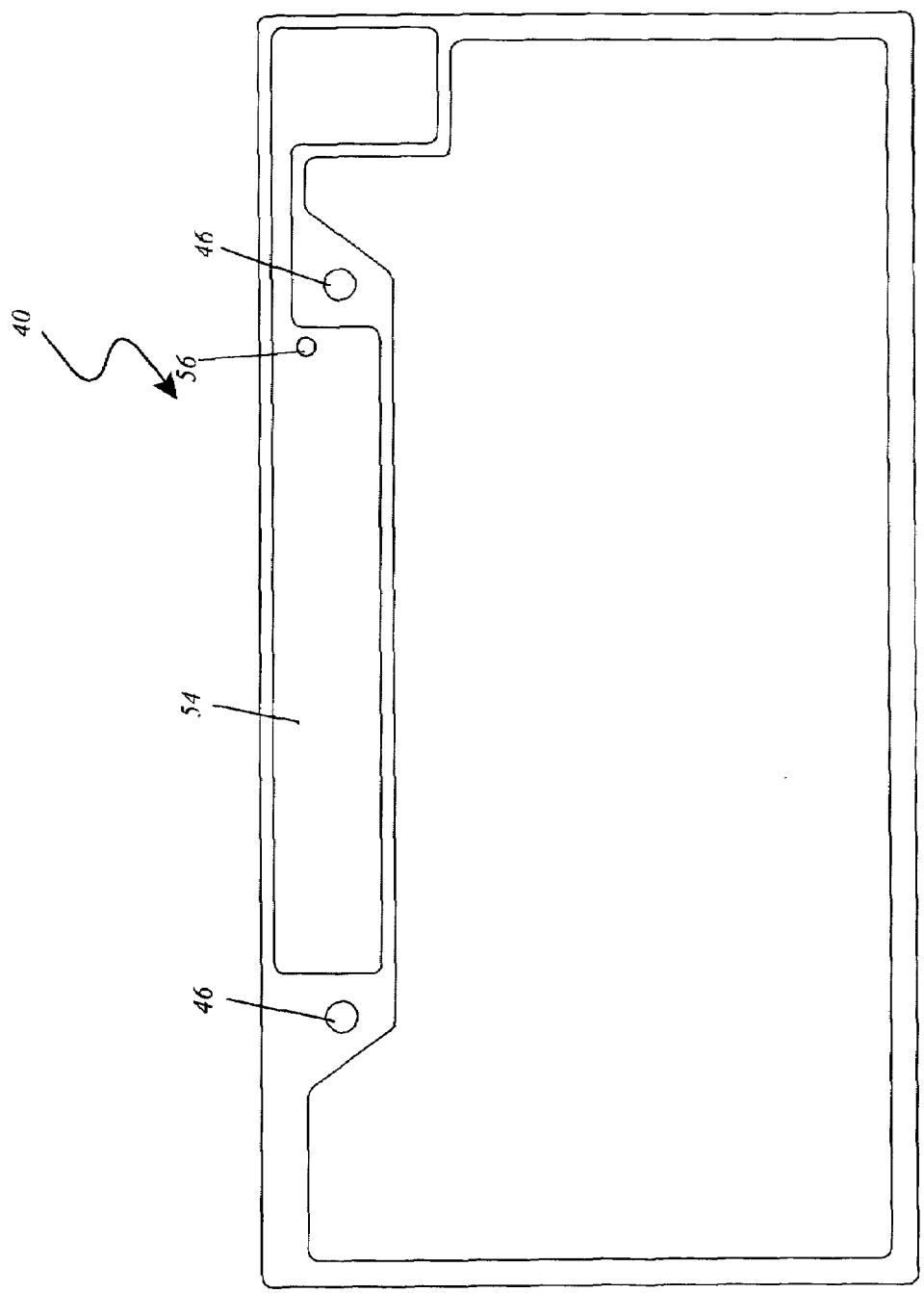
FIG. 4 is a back-side view of the electroluminescent license plate frame of FIG. 1.

FIG. 4 is a back-side view of the electroluminescent license plate frame (40). The upper center portion of the frame that extends to right side of the frame is the backing plate (54) that seals and protects the contents in the recessed pocket (not shown in this FIG.) and may be manufactured out of metal, plastic, epoxy resin, or any other material to effect a seal or protective cover for the strip lighting. The recessed area is the pocket were the color tinted transparent material (not shown in this FIG.) and the electroluminescent strip lighting (not shown in this FIG.) is placed into so that the electroluminescent strip lighting (not shown in this FIG.) will illuminate through the color tinted transparent material (not shown in this FIG.), text advertisement (not shown in this FIG.) and design (not shown in this FIG.). The upper portion to the right is the lead wire hole (56) that is drilled through the backing plate (54). The lead wires (not shown in this FIG.) run through the lead wire hole (56) from the electroluminescent strip lighting (not shown is this FIG.) to the direct current inverter (not shown in this FIG.). Attached to the left side of the inverter is the lead wires (not shown in this FIG.) that are to be attached to a motor vehicle's direct current power source. The upper portion to the right and to the left of the center of the backing plate (54) are mounting holes (46) that are drilled through the frame for the mounting hardware that would attach the frame to a motor vehicle.

FIG. 5 is a top-side view of the electroluminescent license plate frame of FIG. 1; the bottom-side view is a mirror image of the top-side view of all embodiments and will not be shown again.

FIG. 6 is a left-side view of the electroluminescent license plate frame of FIG. 1; the right-side view is a mirror image of the left-side view of all embodiments and will not be shown again.

Embodiment 2

FIG. 7 is a perspective view taken from the users front-side of the electroluminescent license plate frame (40) constructed in accordance with the invention. The upper center portion of the frame has an area for text advertisement (42) that goes all the way through the frame to the recessed pocket (not shown in this FIG.) so light can illuminate through the frame from electroluminescent strip lighting (not shown in this FIG.). USMC is used as an example. The upper right portion of the frame is an area for a design (44) that goes all the way through the frame to the recessed pocket (not shown in this FIG.) so light can illuminate through the frame from electroluminescent strip lighting (not shown in this FIG.). A military rank insignia is used as an example. Both of the electroluminescent lighting strips receive power from a direct current inverter through lead wires (not shown in this FIG.). The upper portion to the right and to the left of the text advertisement (42) are mounting holes (46) that are drilled through the frame for the mounting hardware that would attach the frame to a motor vehicle.

FIG. 8 is a perspective exploded back-side view of the electroluminescent license plate frame (40). The upper center portion of the frame is the text advertisement (42) that goes through the frame to the recessed pocket (48). The upper left portion of the frame is the area for the design (44) that goes all the way through the frame to the recessed pocket (48). The recessed area is the pocket where the color tinted transparent material (50) is placed into. The electroluminescent strip lighting (52) is stacked on top of the colored color tinted transparent material (50) so the electroluminescent strip lighting will illuminate through the text advertisement (42) and the design (44). The lead wire (58), which is connected to electroluminescent strip lighting (52) passes through the lead wire hole (56) that is drilled through the backing plate (54). The backing plate is held in place to cap, seal and protect the contents in the recessed pocket (48) by use of a sealant or screws. The lead wires (58) run to the direct current inverter (60). Attached to the right side of the inverter are the lead wires (62) that are to be attached to a motor vehicle's direct current power source. The area to the left and right of the text advertisement (42) are the mounting holes (46) to mount the frame to a vehicle.

FIG. 9 is a front-side view of the electroluminescent license plate frame (40). The upper center portion of the frame has an area for text advertisement (42) that goes all the way through the frame to the recessed pocket (not shown in this FIG.) so light can illuminate through the text advertisement (42) from electroluminescent strip lighting (not shown in this FIG.). USMC is used as an example. The upper right portion of the frame is an area for a design (44) that goes all the way through the frame to the recessed pocket (not shown in this FIG.) so light can illuminate through the frame from electroluminescent strip lighting (not shown in this FIG.). A military rank insignia is used as an example. Both of the electroluminescent lighting strips receive power from a direct current inverter through lead wires (not shown in this FIG.). The upper portion to the right and to the left of the text advertisement (42) are mounting holes (46) that are drilled through the frame for the mounting hardware that would attach the frame to a motor vehicle.

FIG. 10 is a back-side view of the electroluminescent license plate frame (40). The upper center portion of the frame that extends to left side of the frame is the backing plate (54) that seals and protects the contents in the recessed pocket (not shown in this FIG.) and may be manufactured out of metal, plastic, epoxy resin, or any other material to effect a seal or protective cover for the strip lighting. The recessed area is the pocket where the color tinted transparent material (not shown in this FIG) and the electroluminescent strip lighting (not shown in this FIG.) is placed into so that the electroluminescent strip lighting (not shown in this FIG.) will illuminate through the color tinted transparent material (not shown in this FIG.), text advertisement (not shown in this FIG.) and design (not shown in this FIG.). The upper portion to the left is the lead wire hole (56) that is drilled through the backing plate (54). The lead wires (not shown in this FIG.) run through the lead wire hole (56) from the electroluminescent strip lighting (not shown is this FIG.) to the direct current inverter (not shown in this FIG.). Attached to the right side of the inverter is the lead wires (not shown in this FIG.) that are to be attached to a motor vehicle's direct current power source. To the left and right of the backing plate (54) are mounting holes (46) that are drilled through the frame for the mounting hardware that would attach the frame to a motor vehicle.

Embodiment 3

FIG. 11 is a perspective view taken from the users front-side of the electroluminescent license plate frame (40) constructed in accordance with the invention. The lower center portion of the frame has an area for text advertisement (42) that goes all the way through the frame to the recessed pocket (not shown in this FIG.) so light can illuminate through the frame from electroluminescent strip lighting (not shown in this FIG.). USMC is used as an example. The lower left portion of the frame is an area for a design (44) that goes all the way through the frame to the recessed pocket (not shown in this FIG.) so light can illuminate through the frame from electroluminescent strip lighting (not shown in this FIG.). A military rank insignia is used as an example. Both of the electroluminescent lighting strips receive power from a direct current inverter through lead wires (not shown in this FIG.). The lower portion of the frame to the right and to the left of the text advertisement (42) and the left and right of the upper center portion are mounting holes (46) that are drilled through the frame for the mounting hardware that would attach the frame to a motor vehicle.

FIG. 12 is a perspective exploded back-side view of the electroluminescent license plate frame (40). The lower center portion of the frame is the text advertisement (42) that goes through the frame to the recessed pocket (48). The lower right portion of the frame is the area for the design (44) that goes all the way through the frame to the recessed pocket (48). The recessed area is the pocket where the color tinted transparent material (50) is placed into. The electroluminescent strip lighting (52) is stacked on top of the color tinted transparent material (50) so the electroluminescent strip lighting will illuminate through the text advertisement (42) and the design (44). The lead wire (58), which is connected to electroluminescent strip lighting (52) passes through the lead wire hole (56) that is drilled through the backing plate (54). The backing plate is held in place to cap, seal and protect the contents in the recessed pocket (48) by use of a sealant or screws. The lead wires (58) run to the direct current inverter (60). Attached to the left side of the inverter are the lead wires (62) that are to be attached to a motor vehicle's direct current power source. The area to the left and right of the text advertisement (42) and the left and right of the upper center portion are mounting holes (46) that are drilled through the frame for the mounting hardware that would attach the frame to a motor vehicle.

FIG. 13 is a front-side view of the electroluminescent license plate frame (40). The lower center portion of the frame has an area for text advertisement (42) that goes all the way through the frame to the recessed pocket (not shown in this FIG.) so light can illuminate through the text advertisement (42) from electroluminescent strip lighting (not shown in this FIG.). USMC is used as an example. The lower left portion of the frame is an area for a design (44) that goes all the way through the frame to the recessed pocket (not shown in this FIG.) so light can illuminate through the frame from electroluminescent strip lighting (not shown in this FIG.). A military rank insignia is used as an example. Both of the electroluminescent lighting strips receive power from a direct current inverter through lead wires (not shown in this FIG.). The lower portion to the right and to the left of the text advertisement (42) and the left and right of the upper center portion are mounting holes (46) that are drilled through the frame for the mounting hardware that would attach the frame to a motor vehicle.

FIG. 14 is a back-side view of the electroluminescent license plate frame (40). The lower center portion of the frame that extends to right side of the frame is the backing plate (54) that seals and protects the contents in the recessed pocket (not shown in this FIG.) and may be manufactured out of metal, plastic, epoxy resin, or any other material to effect a seal or protective cover for the strip lighting. The recessed area is the pocket were the color tinted transparent material (not shown in this FIG.) and the electroluminescent strip lighting (not shown in this FIG.) is placed into so that the electroluminescent strip lighting (not shown in this FIG.) will illuminate through the color tinted transparent material (not shown in this FIG.), text advertisement (not shown in this FIG.) and design (not shown in this FIG.). The lower portion to the right is the lead wire hole (56) that is drilled through the backing plate (54). The lead wires (not shown in this FIG.) run through the lead wire hole (56) from the electroluminescent strip lighting (not shown is this FIG.) to the direct current inverter (not shown in this FIG.). Attached to the left side of inverter is the lead wires (not shown in this FIG.) that are to be attached to a motor vehicle's direct current power source. The lower portion to the right and to the left of the backing plate (54) and the left and right of the upper center portion are mounting holes (46) that are drilled through the frame for the mounting hardware that would attach the frame to a motor vehicle.

Embodiment 4

FIG. 15 is a perspective view taken from the users frontside of the electroluminescent license plate frame (40) constructed in accordance with the invention. The lower center portion of the frame has an area for text advertisement (42) that goes all the way through the frame to the recessed pocket (not shown in this FIG.) so light can illuminate through the frame from electroluminescent strip lighting (not shown in this FIG.). USMC is used as an example. The lower right portion of the frame is an area for a design (44) that goes all the way through the frame to the recessed pocket (not shown in this FIG.) so light can illuminate through the frame from electroluminescent strip lighting (not shown in this FIG.). A military rank insignia is used as an example. Both of the electroluminescent lighting strips receive power from a direct current inverter through lead wires (not shown in this FIG.). The lower portion of the frame to the right and to the left of the text advertisement (42) and the left and right of the upper center portion are mounting holes (46) that are drilled through the frame for the mounting hardware that would attach the frame to a motor vehicle.

FIG. 16 is a perspective exploded back-side view of the electroluminescent license plate frame (40). The lower center portion of the frame is the text advertisement (42) that goes through the frame to the recessed pocket (48). The lower left portion of the frame is the area for the design (44) that goes all the way through the frame to the recessed pocket (48). The recessed area is the pocket where the color tinted transparent material (50) is placed into. The electroluminescent strip lighting (52) is stacked on top of the color tinted transparent material (50) so the electroluminescent strip lighting will illuminate through the text advertisement (42) and the design (44). The lead wire (58), which is connected to electroluminescent strip lighting (52) passes through the lead wire hole (56) that is drilled through the backing plate (54). The backing plate is held in place to cap, seal and protect the contents in the recessed pocket (48) by use of a sealant or screws. The lead wires (58) run to the direct current inverter (60). Attached to the right side of the inverter are the lead wires (62) that are to be attached to a motor vehicle's direct current power source. The area to the left and right of the text advertisement (42) and the left and right of the upper center portion are mounting holes (46) that are drilled through the frame for the mounting hardware that would attach the frame to a motor vehicle.

FIG. 17 is a front-side view of the electroluminescent license plate frame (40). The lower center portion of the frame has an area for text advertisement (42) that goes all the way through the frame to the recessed pocket (not shown in this FIG.) so light can illuminate through the text advertisement (42) from electroluminescent strip lighting (not shown in this FIG.). USMC is used as an example. The lower right portion of the frame is an area for a design (44) that goes all the way through the frame to the recessed pocket (not shown in this FIG.) so light can illuminate through the frame from electroluminescent strip lighting (not shown in this FIG.). A military rank insignia is used as an example. Both of the electroluminescent lighting strips receive power from a direct current inverter through lead wires (not shown in this FIG.). The lower portion to the right and to the left of the text advertisement (42) and the left and right of the upper center portion are mounting holes (46) that are drilled through the frame for the mounting hardware that would attach the frame to a motor vehicle.

FIG. 18 is a back-side view of the electroluminescent license plate frame (40). The lower center portion of the frame that extends to left side of the frame is the backing plate (54) that seals and protects the contents in the recessed pocket (not shown in this FIG.) and may be manufactured out of metal, plastic, epoxy resin, or any other material to effect a seal or protective cover for the strip lighting. The recessed area is the pocket were the color tinted transparent material (not shown in this FIG) and the electroluminescent strip lighting (not shown in this FIG.) is placed into so that the electroluminescent strip lighting (not shown in this FIG.) will illuminate through color tinted transparent material (not shown in this FIG.), text advertisement (not shown in this FIG.) and design (not shown in this FIG.). The lower portion to the left is the lead wire hole (56) that is drilled through the backing plate (54). The lead wires (not shown in this FIG.) run through the lead wire hole (56) from the electroluminescent strip lighting (not shown is this FIG.) to the direct current inverter (not shown in this FIG.). Attached to the right side of the inverter is the lead wires (not shown in this FIG.) that are to be attached to a motor vehicle's direct current power source. The lower portion to the right and to the left of the backing plate (54) and the left and right of the upper center portion are mounting holes (46) that are drilled through the frame for the mounting hardware that would attach the frame to a motor vehicle.

Embodiment 5

FIG. 19 is a perspective view taken from the users frontside of the electroluminescent license plate frame (40) constructed in accordance with the invention. The lower center portion of the frame has an area for text advertisement (42) that goes all the way through the frame to the recessed pocket (not shown in this FIG.) so light can illuminate through the frame from electroluminescent strip lighting (not shown in this FIG.). USMC is used as an example. The electroluminescent lighting strip receives power from a direct current inverter through lead wires (not shown in this FIG.). The lower portion of the frame to the right and to the left of the text advertisement (42) and the left and right of the upper center portion are mounting holes (46) that are drilled through the frame for the mounting hardware that would attach the frame to a motor vehicle.

FIG. 20 is a perspective exploded back-side view of the electroluminescent license plate frame (40). The lower center portion of the frame is the text advertisement (42) that goes through the frame to the recessed pocket (48). The recessed area is the pocket where the color tinted transparent material (50) is placed into. The electroluminescent strip lighting (52) is stacked on top of the color tinted transparent material (50) so the electroluminescent strip lighting will illuminate through the text advertisement (42). The lead wire (58) is connected to electroluminescent strip lighting (52) passes through the lead wire hole (56) which is drilled through the backing plate (54). The backing plate is held in place to cap, seal and protect the contents in the recessed pocket (48) by use of a sealant or screws. The lead wires (58) run to the direct current inverter (60). Attached to the left side of the inverter are the lead wires (62) that are to be attached to a motor vehicle's direct current power source. The area to the left and right of the text advertisement (42) and the left and right of the upper center portion are mounting holes (46) that are drilled through the frame for the mounting hardware that would attach the frame to a motor vehicle.

FIG. 21 is a front-side view of the electroluminescent license plate frame (40). The lower center portion of the frame has an area for text advertisement (42) that goes all the way through the frame to the recessed pocket (not shown in this FIG.) so light can illuminate through the text advertisement (42) from electroluminescent strip lighting (not shown in this FIG.). USMC is used as an example. The electroluminescent lighting strip receives power from a direct current inverter through lead wires (not shown in this FIG.). The lower portion to the right and to the left of the text advertisement (42) and the left and right of the upper center portion are mounting holes (46) that are drilled through the frame for the mounting hardware that would attach the frame to a motor vehicle.

FIG. 22 is a back-side view of the electroluminescent license plate frame (40). The lower center portion is the backing plate (54) that seals and protects the contents in the recessed pocket (not shown in this FIG.) and may be manufactured out of metal, plastic, epoxy resin, or any other material to effect a seal or protective cover for the strip lighting. The recessed area is the pocket where the color tinted transparent material (not shown in this FIG) and the electroluminescent strip lighting (not shown in this FIG.) is placed inside so that the electroluminescent strip lighting (not shown in this FIG.) will illuminate through the color tinted transparent material (not shown in this FIG.) and the text advertisement (not shown in this FIG.). The lower portion to the right is the lead wire hole (56) that is drilled through the backing plate (54). The lead wires (not shown in this FIG.) run through the lead wire hole (56) from the electroluminescent strip lighting (not shown is this FIG.) to the direct current inverter (not shown in this FIG.). Attached to the left side of the inverter is the lead wires (not shown in this FIG.) that are to be attached to a motor vehicle's direct current power source. The lower portion to the right and to the left of the backing plate (54) and the left and right of the upper center portion are mounting holes (46) that are drilled through the frame for the mounting hardware that would attach the frame to a motor vehicle.

Embodiment 6

FIG. 23 is a perspective view taken from the users frontside of the electroluminescent license plate frame (40) constructed in accordance with the invention. The upper center portion of the frame has an area for text advertisement (42) that goes all the way through the frame to the recessed pocket (not shown in this FIG.) so light can illuminate through the frame from electroluminescent strip lighting (not shown in this FIG.). USMC is used as an example. The electroluminescent lighting strip receives power from a direct current inverter through lead wires (not shown in this FIG.). The upper portion of the frame to the right and to the left of the text advertisement (42) and the left and right of the lower center portion are mounting holes (46) that are drilled through the frame for the mounting hardware that would attach the frame to a motor vehicle.

FIG. 24 is a perspective exploded back-side view of the electroluminescent license plate frame (40). The upper center portion of the frame is the text advertisement (42) that goes through the frame to the recessed pocket (48). The recessed area, is the pocket where the color tinted transparent material

(50) is placed into. The electroluminescent strip lighting (52) is stacked on top of the color tinted transparent material (50) so the electroluminescent strip lighting will illuminate through the text advertisement (42). The lead wire (58), which is connected to electroluminescent strip lighting (52), passes through the lead wire hole (56) that is drilled through the backing plate (54). The backing plate is held in place to cap, seal and protect the contents in the recessed pocket (48) by use of a sealant or screws. The lead wires (58) run to the direct current inverter (60). Attached to the left side of the inverter are the lead wires (62) that are to be attached to a motor vehicle's direct current power source. The area to the left and right of the text advertisement (42) are mounting holes (46) that are drilled through the frame for the mounting hardware that would attach the frame to a motor vehicle.

FIG. 25 is a front-side view of the electroluminescent license plate frame (40). The upper center portion of the frame has an area for text advertisement (42) that goes all the way through the frame to the recessed pocket (not shown in this FIG.) so light can illuminate through the text advertisement (42) from electroluminescent strip lighting (not shown in this FIG.). USMC is used as an example. The electroluminescent lighting strip receives power from a direct current inverter through lead wires (not shown in this FIG.). The portion to the right and to the left of the text advertisement (42) are mounting holes (46) that are drilled through the frame for the mounting hardware that would attach the frame to a motor vehicle.

FIG. 26 is a back-side view of the electroluminescent license plate frame (40). The upper center portion is the backing plate (54) that seals and protects the contents in the recessed pocket (not shown in this FIG.) and may be manufactured out of metal, plastic, epoxy resin, or any other material to effect a seal or protective cover for the strip lighting. The recessed area is the pocket were the color tinted transparent material (not shown in this FIG) and the electroluminescent strip lighting (not shown in this FIG.) is placed into so that the electroluminescent strip lighting (not shown in this FIG.) will illuminate through the color tinted transparent material (not shown in this FIG.) and the text advertisement (not shown in this FIG.). The upper portion to the left is the lead wire hole (56) that is drilled through the backing plate (54). The lead wires (not shown in this FIG.) run through the lead wire hole (56) and from the electroluminescent strip lighting (not shown in this FIG.) to the direct current inverter (not shown in this FIG.). Attached to the left side of the inverter is the lead wires (not shown in this FIG.) that are to be attached to a motor vehicle's direct current power source. The upper portion to the right and to the left of the backing plate (54) are mounting holes (46) that are drilled through the frame for the mounting hardware that would attach the frame to a motor vehicle.

Embodiment 7

FIG. 27 is a perspective exploded back-side view of the electroluminescent license plate frame (40) constructed in accordance with the invention. The upper and lower center portions of the frame are the text advertisements (42) that go through the frame to the recessed pockets (48). The recessed areas are the pockets where the color tinted transparent material (50) are placed into. The electroluminescent strip lighting (52) is stacked on top of the color tinted transparent material (50) so the electroluminescent strip lighting will illuminate through the text advertisements (42). The lead wire (58) which is connected to the electroluminescent strip lighting (52) passes through the lead wire hole (56) that is drilled through the backing plate's (54) upper left corner. The backing plate is held in place to cap, seal and protect the contents in the recessed pockets (48) by use of a sealant or screws. The lead wires (58) run to the direct current inverter (60). Attached to the right side of the inverter are the lead wires (62) that are to be attached to a motor vehicle's direct current power source. The areas to the left and right of upper and lower text advertisements (42) are mounting holes (46) that are drilled through the frame for the mounting hardware that would attach the frame to a motor vehicle.

FIG. 28 is a perspective view taken from the consumer's front-side of the electroluminescent license plate frame (40). The upper and lower center portions of the frame have an area for text advertisement (42) that go all the way through the frame to the recessed pockets (not shown in this FIG.) so light can illuminate through the frame from electroluminescent strip lighting (not shown in this FIG.). The word TEXT is used as an example. The electroluminescent lighting strip receives power from a direct current inverter through lead wires (not shown in this FIG.). To the right and to the left of the text advertisement (42) portions are mounting holes (46) that are drilled through the frame for the mounting hardware that would attach the frame to a motor vehicle.

FIG. 29 is a front-side view of the electroluminescent license plate frame (40). The upper and lower center portions of the frame have an area for text advertisement (42) that go all the way through the frame to the recessed pockets (not shown in this FIG.) so light can illuminate through the text advertisements (42) from electroluminescent strip lighting (not shown in this FIG.). The word TEXT is used as an example. The electroluminescent lighting strips receive power from a direct current inverter through lead wires (not shown in this FIG.). The portions to the right and to the left of the text advertisements (42) are mounting holes (46) that are drilled through the frame for the mounting hardware that would attach the frame to a motor vehicle.

FIG. 30 is a back-side view of the electroluminescent license plate frame (40). The upper and lower center portion is the backing plate (54) that seals and protects the contents in the recessed pockets (not shown in this FIG.), and may be manufactured out of metal, plastic, epoxy resin, or any other material to effect a seal or protective cover for the strip lighting. The recessed areas are the pockets where color tinted transparent material (not shown in this FIG) and the electroluminescent strip lighting (not shown in this FIG.) are placed into so that the electroluminescent strip lighting (not shown in this FIG.) will illuminate through the color tinted transparent material (not shown in this FIG.) and the text advertisements (not shown in this FIG.). The upper portion to the left is the lead wire hole (56) that is drilled through the backing plate (54). The lead wires (not shown in this FIG.) run through the lead wire hole (56) from the electroluminescent strip lighting (not shown is this FIG.) to the direct current inverter (not shown in this FIG.).

Attached to the right side of the inverter are the lead wires (not shown in this FIG.) that are to be attached to a motor vehicle's direct current power source. The portions to the right and to the left of the text advertisements (42) are mounting holes (46) that are drilled through the frame for the mounting hardware that would attach the frame to a motor vehicle.

Operation

In operation one uses the frame in a normal manner with the electroluminescent license plate frame (40) (FIGS. 1 through 30) mounted to a motor vehicle and the lead wires (62) (FIGS. 2,8,12,16,20,24 and 27) from the direct current inverter (60) (FIGS. 2,8,12,16,20,24 and 27) connected to the motor vehicles direct current power source. The user can, when desired illuminate the text advertisement (42) (FIGS. 1 through 30) and/or design (44) (FIGS. 1 through 15) by adding or removing direct current power from the inverter, When mounting the frame to a motor vehicle, four effects increase the frame's appeal:

The frame is a thin design that illuminates causing a visual appeal.

The use of color tinted transparent material increases the variety of color that can illuminate through the text advertisement (42) and/or design (44).

The wide variety of text fonts that can be cut, milled or molded through the frame that illuminate increase visual aspects.

The method of a new use of strip lighting (52) adds to the appeal.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An electroluminescent license plate frame for providing advertisement on a vehicle, said license plate frame comprising:
    a front plate directly mounted to the vehicle and having oppositely facing front and back portions respectively;
    a recessed pocket formed within said front plate;
    an electroluminescent strip lighting attached to positive and negative wires of a direct current power source of the vehicle, said strip lighting being recessed into said back portion of said frame;
    a transparent and color tinted member recessed between said strip lighting and said frame respectively;
    a direct current inverter for receiving power from the direct current power source and for transmitting the power to said strip lighting;
    surface indicia formed on said front portion of said frame, said surface indicia including at least one of a text indicia and a design indicia respectively; and,
    a backing plate attached to said front plate of said frame and being provided with an opening for receiving the lead wires therethrough;
    wherein said strip lighting and said color tinted transparent member are held and sealed between said front and backing plates respectively.

2. The license plate frame of claim 1, wherein said frame comprises:
    an upper center portion bearing said text indicia that passes through said frame to said recessed pocket so light can outwardly illuminate through said frame from said strip lighting;
    an upper left portion bearing said design indicia passing through said frame to said recessed pocket so light outwardly illuminates through said frame from said strip lighting; and,
    mounting holes drilled through said frame for receiving mounting hardware therethrough in such a manner that said frame is securely attached to the vehicle.

3. The license plate frame of claim 2, wherein said strip lighting is stacked on top of said color tinted transparent member so that said strip lighting illuminates through said surface indicia and said design indicia respectively, said backing plate being statically engaged with said front plate such that said strip lighting remains fixedly disposed therebetween during driving conditions.

4. The license plate frame of claim 1, wherein said surface indicia is located at a lower center portion of said frame, said text indicia passing through said frame to said recessed pocket so that light outwardly illuminates through said frame from said strip lighting;
    wherein left and rights corners of lower and upper portions of said frame are provided with mounting holes for receiving mounting hardware and attaching said frame to the vehicle.

5. The license plate frame of claim 1, wherein said text indicia is disposed along a lower center portion of said frame, said design indicia being disposed along a lower right portion of said frame.

6. The license plate frame of claim 1, wherein said text indicia is disposed at an upper center portion of said frame.

7. The license plate frame of claim 1, wherein multiple ones of said text indicia are disposed at upper and lower center portions of said frame.

8. An electroluminescent license plate frame for providing advertisement on a vehicle, said license plate frame comprising:
    a front plate directly mounted to the vehicle and having oppositely facing front and back portions respectively;
    a recessed pocket formed within said front plate;
    an electroluminescent strip lighting attached to positive and negative wires of a direct current power source of the vehicle, said strip lighting being recessed into said back portion of said frame;
    a transparent and color tinted member recessed between said strip lighting and said frame respectively;
    a direct current inverter for receiving power from the direct current power source and for transmitting the power to said strip lighting;
    surface indicia formed on said front portion of said frame, said surface indicia including at least one of a text indicia and a design indicia respectively; and,
    a backing plate attached to said front plate of said frame and being provided with an opening for receiving the lead wires therethrough, said front and backing plates being coextensively shaped;
    wherein said strip lighting and said color tinted transparent member are held and sealed between said front and backing plates respectively.

9. The license plate frame of claim 8, wherein said frame comprises:
    an upper center portion bearing said text indicia that passes through said frame to said recessed pocket so light can outwardly illuminate through said frame from said strip lighting;
    an upper left portion bearing said design indicia passing through said frame to said recessed pocket so light outwardly illuminates through said frame from said strip lighting; and,
    mounting holes drilled through said frame for receiving mounting hardware therethrough in such a manner that said frame is securely attached to the vehicle.

10. The license plate frame of claim 9, wherein said strip lighting is stacked on top of said color tinted transparent member so that said strip lighting illuminates through said surface indicia and said design indicia respectively, said backing plate being statically engaged with said front plate such that said strip lighting remains fixedly disposed therebetween during driving conditions.

11. The license plate frame of claim 8, wherein said surface indicia is located at a lower center portion of said frame, said text indicia passing through said frame to said recessed pocket so that light outwardly illuminates through said frame from said strip lighting;

wherein left and rights corners of lower and upper portions of said frame are provided with mounting holes for receiving mounting hardware and attaching said frame to the vehicle.

12. The license plate frame of claim 8, wherein said text indicia is disposed along a lower center portion of said frame, said design indicia being disposed along a lower right portion of said frame.

13. The license plate frame of claim 8, wherein said text indicia is disposed at an upper center portion of said frame.

14. The license plate frame of claim 8, wherein multiple ones of said text indicia are disposed at upper and lower center portions of said frame.

15. A method for displaying illuminated advertisement indicia on a vehicle license plate frame, said method comprising the steps of:

a. mounting a front plate directly to the vehicle, said front plate having oppositely facing front and back portions respectively;

b. forming a recessed pocket within said front plate;

c. attaching an electroluminescent strip lighting to positive and negative wires of a direct current power source of the vehicle, said strip lighting being recessed into said back portion of said frame;

d. recessing a color tinted transparent member between said strip lighting and said frame respectively;

e. electrically coupling a direct current inverter to said strip lighting and the positive and negative wires for receiving power from the direct current power source and for transmitting the power to said strip lighting;

f. forming surface indicia on said front portion of said frame, said surface indicia including at least one of a text indicia and a design indicia respectively;

g. attaching a backing plate to said front plate of said frame and being provided with an opening for receiving the lead wires therethrough; and, h. sealing said strip lighting and said color tinted transparent member between said front and backing plates respectively.

16. The method of claim 15, wherein said frame comprises:

an upper center portion bearing said text indicia that passes through said frame to said recessed pocket so light can outwardly illuminate through said frame from said strip lighting;

an upper left portion bearing said design indicia passing through said frame to said recessed pocket so light outwardly illuminates through said frame from said strip lighting; and, mounting holes drilled through said frame for receiving mounting hardware therethrough in such a manner that said frame is securely attached to the vehicle.

17. The method of claim 16, wherein said strip lighting is stacked on top of said color tinted transparent member so that said strip lighting illuminates through said surface indicia and said design indicia respectively, said backing plate being statically engaged with said front plate such that said strip lighting remains fixedly disposed therebetween during driving conditions.

18. The method of claim 17, wherein said surface indicia is located at a lower center portion of said frame, said text indicia passing through said frame to said recessed pocket so that light outwardly illuminates through said frame from said strip lighting;

wherein left and rights corners of lower and upper portions of said frame are provided with mounting holes for receiving mounting hardware and attaching said frame to the vehicle.

19. The method of claim 18 wherein said text indicia is disposed along a lower center portion of said frame, said design indicia being disposed along a lower right portion of said frame.

20. The method of claim 19, wherein said text indicia is disposed at an upper center portion of said frame.

* * * * *